US006875801B2

(12) United States Patent
Shendy et al.

(10) Patent No.: US 6,875,801 B2
(45) Date of Patent: Apr. 5, 2005

(54) SOLUBILIZED DEFOAMERS FOR CEMENTITIOUS COMPOSITIONS

(75) Inventors: Samy M. Shendy, Cuyahoga Falls, OH (US); Jeffrey R. Bury, Macedonia, OH (US); Thomas M. Vickers, Jr., Concord Township, OH (US); Frank Ong, Solon, OH (US)

(73) Assignee: Construction Research & Technology GmbH, Trostberg (DE)

( * ) Notice: Subject to any disclaimer, the term of this patent is extended or adjusted under 35 U.S.C. 154(b) by 115 days.

(21) Appl. No.: 10/328,102

(22) Filed: Dec. 23, 2002

(65) Prior Publication Data

US 2003/0187101 A1 Oct. 2, 2003

Related U.S. Application Data

(63) Continuation of application No. 09/732,380, filed on Dec. 7, 2000, now Pat. No. 6,569,924.
(60) Provisional application No. 60/170,062, filed on Dec. 10, 1999.

(51) Int. Cl.$^7$ .......................... C04B 24/24; C04B 24/12
(52) U.S. Cl. ................................ 524/5; 524/4
(58) Field of Search .......................... 524/4–5

(56) References Cited

U.S. PATENT DOCUMENTS

| | | |
|---|---|---|
| 4,209,336 A | 6/1980 | Previte |
| 4,948,429 A | 8/1990 | Arfaei |
| 5,085,708 A | 2/1992 | Moriya et al. |
| 5,156,679 A | 10/1992 | Gartner et al. |
| 5,158,996 A | 10/1992 | Valenti |
| 5,162,402 A | 11/1992 | Ogawa et al. |
| 5,348,993 A | 9/1994 | Daeumer et al. |
| 5,358,566 A | 10/1994 | Tanaka et al. |
| 5,393,343 A | 2/1995 | Darwin et al. |
| 5,494,516 A | 2/1996 | Drs et al. |
| 5,583,183 A | 12/1996 | Darwin et al. |
| 5,609,681 A | 3/1997 | Drs et al. |
| 5,612,396 A | 3/1997 | Valenti et al. |
| 5,633,298 A | 5/1997 | Arfaei et al. |
| 5,643,978 A | 7/1997 | Darwin et al. |
| 5,660,626 A | 8/1997 | Ohta et al. |
| 5,661,206 A | 8/1997 | Tanaka et al. |
| 5,665,158 A | 9/1997 | Darwin et al. |
| 5,668,195 A | 9/1997 | Leikauf |
| 5,670,578 A | 9/1997 | Shawl |
| 5,674,929 A | 10/1997 | Melbye |
| 5,703,174 A | 12/1997 | Arfaei et al. |
| 5,725,657 A | 3/1998 | Darwin et al. |
| 5,728,207 A | 3/1998 | Arfaei et al. |
| 5,753,744 A | 5/1998 | Darwin et al. |
| 5,798,425 A | 8/1998 | Albrecht et al. |
| 5,840,114 A | 11/1998 | Jeknavorian et al. |
| 5,912,284 A | 6/1999 | Hirata et al. |
| 6,008,275 A | 12/1999 | Moreau et al. |
| 6,083,184 A | 7/2000 | Kenosh |
| 6,133,347 A | 10/2000 | Vickers et al. |
| 6,136,950 A | 10/2000 | Vickers et al. |
| 6,267,814 B1 | 7/2001 | Bury et al. |
| 6,284,867 B1 | 9/2001 | Vickers et al. |
| 6,290,770 B1 | 9/2001 | Moreau et al. |
| 6,310,143 B1 | 10/2001 | Vickers et al. |
| 6,451,881 B1 | 9/2002 | Vickers et al. |
| 6,492,461 B1 | 12/2002 | Vickers et al. |

FOREIGN PATENT DOCUMENTS

| | | |
|---|---|---|
| DE | 43 24 334 A1 | 1/1994 |
| EP | 0930321 A2 | 7/1989 |
| EP | 0 342 609 A2 | 11/1989 |
| EP | 0753488 A2 | 1/1997 |
| EP | 0930279 A1 | 7/1999 |
| FR | 2 760 004 A1 | 8/1998 |
| GB | 2280180 | 1/1995 |
| JP | 02-252643 A | 10/1990 |
| WO | WO 94/05896 A1 | 3/1994 |
| WO | WO 98 31643 A | 7/1998 |
| WO | WO 98/38142 * | 9/1998 |

OTHER PUBLICATIONS

Koda Susumu, et al. "Self–Leveling Cement Composition With GOod Flowability for Floors" *Chemical Abstracts*, Jan. 25,1993 p. 291, Abstract No. 26621, vol. 118, No. 4, Columbus, Ohio, USA.

* cited by examiner

*Primary Examiner*—Peter Szekely
(74) *Attorney, Agent, or Firm*—Curatolo Sidoti Co. LPA; Joseph G. Curatolo; James E. Oehlenschlager

(57) ABSTRACT

Amine solubilizing agents are mixed with water insoluble defoamers and optionally a dispersant for cementitious compositions to provide an admixture for cementitious compositions that is stable over time. A cementitious composition is provided that includes cementitious material, water, a water insoluble defoamer, optionally a dispersant for cementitious compositions, and an amine solubilizing agent that solubilizes the water insoluble defoamer. A method is provided for making a cementitious composition that includes mixing cementitious material, water, a water insoluble defoamer, an amine solubilizing agent that solubilizes the water insoluble defoamer, and optionally a dispersant for cementitious compositions.

77 Claims, No Drawings

SOLUBILIZED DEFOAMERS FOR CEMENTITIOUS COMPOSITIONS

CROSS REFERENCE TO RELATED APPLICATIONS

This application is a continuation in part of U.S. Ser. No. 09/732,380, filed on Dec. 7, 2000 now U.S. Pat. No. 6,569,924 which claims priority from U.S. Provisional Patent Application No. 60/170,062, filed Dec. 10, 1999, both of which are incorporated herein by reference.

BACKGROUND

Hydraulic cements, such as Portland cement, are used to form structural formations. Hydraulic cements can be mixed with aggregate to form mortars, which additionally include small aggregate and water, or concrete, which are mortars which additionally include large aggregate.

When working with hydraulic cements, it is desired to increase the slump properties of the initially formed hydraulic cement composition to aid in placement of the composition and to extend the period of flowability in order to provide adequate time to complete placement of the cementitious composition. Admixtures can be added to hydraulic cement to increase the slump. Additionally, admixtures can be added that also reduce the amount of water required and to produce flowable cementitious compositions. The reduced water content increases the strength and improves the durability of the resulting hydraulic cement formation.

One admixture for increasing the flowability and reducing the water content is a polycarboxylate dispersant. Polycarboxylate dispersants are polymers with a carbon backbone with pendant side chains, wherein at least a portion of the side chains are attached to the backbone through a carboxyl group or an ether group. Polycarboxylate dispersants are very effective at dispersing and reducing the water content in hydraulic cements.

One drawback to polycarboxylate dispersants is that they have a tendency to entrain air in the cementitious composition during mixing. While some entrained air may be desired for particular applications, such as providing freeze-thaw durability to the cementitious composition, an excess of entrained air is detrimental to the compressive strength of the resulting hydraulic formation.

Generally in the construction industry, non-air entrained cementitious compositions having an air content of less than 3% is desired, with an air content of less than 2% being preferred. Air entraining admixtures are sometimes used to provide purposeful air contents of 5–8% which improves the freeze thaw durability of the cementitious mixture. When this is the case, it is desirable to be able to adjust the air content by changing the air entrainer dosage and to have the resulting air remain stable over time.

To overcome the excess entraining of air in cementitious compositions, defoamers have been added to the cementitious mix to reduce the air content to a desired level. Defoamers typically have been included with the polycarboxylate admixture. However, the defoamers used in the prior art have been non-water-soluble compositions used alone. The problem with non-water-soluble defoamers is that they give an inadequate long-term storage stability to the admixture resulting, in phase separation. The polycarboxylate dispersant is generally a water soluble dispersant. When a non-water-soluble defoamer is used in conjunction with a water-soluble dispersant, the mixture separates over time. This requires that the mixture be mixed prior to use. Also, some insoluble defoamers can cause unpredictable air contents over time.

Another technique used in the prior art has been the grafting of the defoamer onto the dispersant molecule.

The prior art, however, has not shown the combination of a defoamer that is not chemically combined with the polycarboxylate dispersant that is used in conjunction with an amine solubilizing or stabilizing agent.

What is needed in the industry is a combination of a water insoluble defoamer, a dispersant for cementitious compositions, and an amine solubilizing agent that solubilizes or stabilizes the water insoluble defoamer that produces controllable air contents in non-air entrained and air entrained cementitious compositions.

SUMMARY

Amine solubilizing agents can be combined with water insoluble defoamers and dispersants for cementitious compositions to provide an admixture for cementitious compositions that is stable over time. The resulting admixture has long term storage stability so that the admixture does not need to be mixed prior to use at the work site.

An admixture composition for cementitious compositions is provided that comprises a water insoluble defoamer, an amine solubilizing agent that solubilizes the water insoluble defoamer, and optionally a dispersant for cementitious compositions.

A cementitious composition is provided that comprises cementitious material, water, a water insoluble defoamer, an amine solubilizing agent that solubilizes the water insoluble defoamer, and optionally a dispersant for cementitious compositions.

A method of making a cementitious composition is provided that comprises mixing cementitious material, water, a water insoluble defoamer, an amine solubilizing agent that solubilizes the water insoluble defoamer, and optionally a dispersant for cementitious compositions.

DETAILED DESCRIPTION

A combination of amine solubilizing agents that is effective as a solubilizing agent in the salt form and deactivated at an alkaline pH and defoamers are provided that are used in conjunction with a dispersant for cementitious compositions to control air contents in cementitious compositions.

The term amine solubilizing agent refers to a material that can solubilize insoluble material. Solubilization is defined as a mode of bringing into solution substances that are otherwise insoluble in a given medium. Solubilization involves the previous presence of a colloidal (organized) solution whose particles take up and incorporate within or upon themselves the otherwise insoluble material. (M. E. L. McBain and E. Hutchinson, Solubilization and Related Phenomena, Academic Press, New York (1955). Generally, an amine solubilizing agent is a solubilizing surfactant. The amine solubilizing agents that are present in the invention may include but are not limited to amine solubilizing agents sold by Akzo Nobel Surface Chemistry, LLC (Chicago, Ill.), Corsicana Technologies, Inc. (Dallas, Tex.), Croda, Inc. (New York, N.Y.), Scher Chemicals, Inc., Lonza, Inc. (Switzerland), Colonial Chemical Company (South Pittsburg, Tenn.), Tomah Products, Inc.(Milton, Wis.), Uniqema (USA Contact—New Castle, Del.), and Stepan Company (Northfield, Ill.).

The term dispersant for cementitious compositions throughout this specification includes polycarboxylate dispersants and oligomeric dispersants.

The term polycarboxylate dispersant throughout this specification refers to polymers with a carbon or polyamide backbone with pendant side chains, wherein at least a portion of the side chains are attached to the backbone through a carboxyl group or an ether group. The term dispersant is also meant to include those chemicals which also function as a plasticizer, water reducer, fluidizer, antiflocculating agent, or superplasticizer for cementitious compositions. Examples of polycarboxylate dispersants can be found in U.S. Ser. No. 09/937,810, U.S. Pat. No. 6,267,814, U.S. Pat. No. 6,290,770, U.S. Pat. No. 6,310,143, U.S. Pat. No. 6,211,317, U.S. Pat. No. 6,187,841, U.S. Pat. No. 5,158,996, U.S. Pat. No. 6,008,275, U.S. Pat. No. 6,136,950, U.S. Pat. No. 6,284,867, U.S. Pat. No. 5,609,681, U.S. Pat. No. 5,494,516; U.S. Pat. No. 5,674,929, U.S. Pat. No. 5,660,626, U.S. Pat. No. 5,668,195, U.S. Pat. No. 5,661,206, U.S. Pat. No. 5,358,566, U.S. Pat. No. 5,162,402, U.S. Pat. No. 5,798,425, U.S. Pat. No. 5,612,396, U.S. Pat. No. 6,063,184, and U.S. Pat. No. 5,912,284, U.S. Pat. No. 5,840,114, U.S. Pat. No. 5,753,744, U.S. Pat. No. 5,728,207, U.S. Pat. No. 5,725,657, U.S. Pat. No. 5,703,174, U.S. Pat. No. 5,665,158, U.S. Pat. No. 5,643,978, U.S. Pat. No. 5,633,298, U.S. Pat. No. 5,583,183, and U.S. Pat. No. 5,393,343, which are incorporated herein by reference.

The term oligomenic dispersant throughout this specification refers to oligomers that are a reaction product of a component A, optionally component B, and component C that are defined in U.S. Pat. No. 6,133,347, U.S. Pat. No. 6,451,881, and U.S. Pat. No. 6,492,461, which re hereby incorporated by reference.

The dispersants used in combination with the water insoluble defoamer and the amine solubilizing agent that solubilizes the water insoluble defoamer are at least one of:

a) a dispersant of Formula (I):

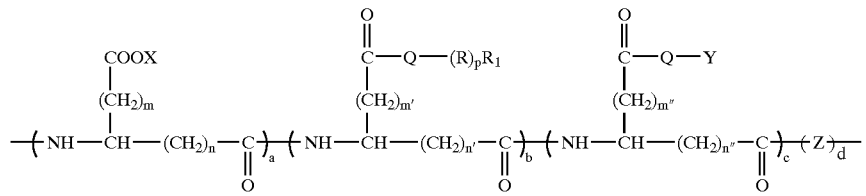

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
Y is at least one of hydrogen, an alkali earth metal ion, an alkaline earth metal ion, ammonium ion, amine, a hydrophobic hydrocarbon or polyalkylene oxide moiety that functions as a defoamer;
m, m', m'', n, n', and n'' are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

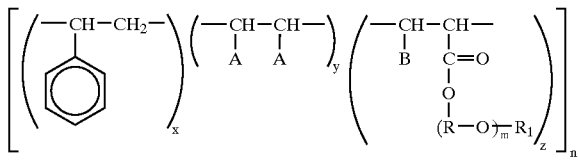

wherein in Formula (II):
A is COOM or optionally in the "y" structure an acid anhydride group (—CO—O—CO—) is formed in place of the A groups between the carbon atoms to which the A groups are bonded to form an anhydride;
B is COOM
M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;
R is a $C_{2-6}$ alkylene radical;
$R_1$ is a $C_{1-20}$ alkyl, $C_{6-9}$ cycloalkyl, or phenyl group;
x, y, and z are a number from 0.01 to 100;
m is a number from 1 to 100; and
n is a number from 10 to 100;

c) a dispersant comprising at least one polymer or a salt thereof having the form of a copolymer of
  i) a maleic anhydride half-ester with a compound of the formula RO(AO)$_m$H, wherein R is a $C_1$–$C_{20}$ alkyl group, A is a $C_{2-4}$ alkylene group, and m is an integer from 2–16; and
  ii) a monomer having the formula $CH_2$=$CHCH_2$—(OA)$_n$OR, wherein n is an integer from 1–90 and R is a $C_{1-20}$ alkyl group;

d) a dispersant obtained by copolymerizing 5 to 98% by weight of an (alkoxy)polyalkylene glycol mono(meth) acrylic ester monomer (a) represented by the following general formula (1):

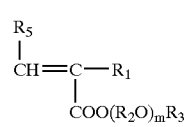

(1)

-continued

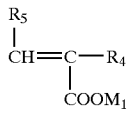
(2)

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a reaction product of component A, optionally component B, and component C;

wherein each component A is independently a nonpolymeric, multi-functional moiety or combination of mono or multifunctional moieties that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof;

wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof; and g) a dispersant of Formula (III):

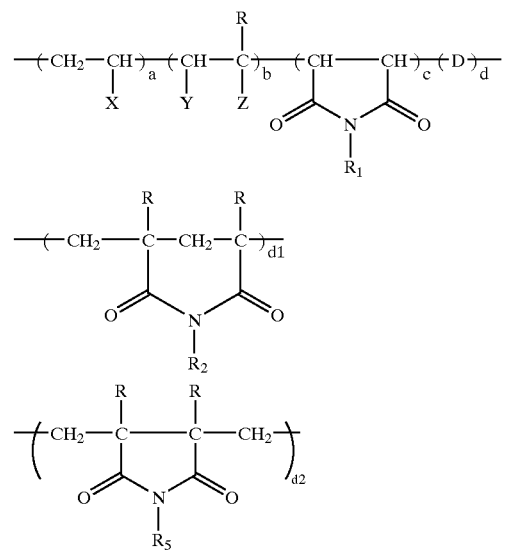

wherein in Formula (III):

D=a component selected from the group consisting of the structure d1, the structure d2, and mixtures thereof;

X=H, $CH_3$, $C_2$ to $C_6$ Alkyl, Phenyl, p-Methyl Phenyl, or Sulfonated Phenyl;

Y=H or —COOM;

R=H or $CH_3$;

Z=H, —$SO_3M$, —$PO_3M$, —COOM, —$O(CH_2)_nOR_3$ where n=2 to 6, —$COOR_3$, or —$(CH_2)_nOR_3$ where n=0 to 6, —$CONHR_3$, —$CONHC(CH_3)_2$ $CH_2SO_3M$, —$COO(CHR_4)_nOH$ where n=2 to 6, or —$O(CH_2)_nOR_4$ wherein n=2 to 6;

$R_1$, $R_2$, $R_3$, $R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$=H, Methyl, $C_2$ to about $C_6$ Alkyl, or about $C_6$ to about $C_{10}$ aryl;

M=H, Alkali Metal, Alkaline Earth Metal, Ammonium, Amine, triethanol amine, Methyl, or $C_2$ to about $C_6$ Alkyl;

a=0 to about 0.8;

b=about 0.2 to about 1.0;

c=0 to about 0.5;

d=0 to about 0.5; and wherein a, b, c, and d represent the mole fraction of each unit and the sum of a, b, c, and d is 1.0;

h) a dispersant of Formula (IV):

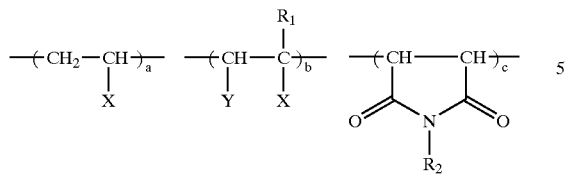

wherein in Formula (IV):
the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;
X=H, $CH_3$, $C_2$ to $C_6$ Alkyl, Phenyl, p-Methyl Phenyl, p-Ethyl Phenyl, Carboxylated Phenyl, or Sulfonated Phenyl;
Y=H, —COOM, —COOH, or W;
W=a hydrophobic defoamer represented by the formula $R_5O$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;
Z=H, —COOM, —O$(CH_2)_n$OR$_3$ where n=2 to 6, —COOR$_3$, —$(CH_2)_n$OR$_3$ where n=0 to 6, or —CONHR$_3$;
$R_1$=H, or $CH_3$;
$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;
$R_4$=H, Methyl, or $C_2$ to $C_8$ Alkyl;
$R_5$=$C_1$ to $C_{1-8}$ alkyl or $C_6$ to $C_{1-8}$ alkyl aryl;
M=Alkali Metal, Alkaline Earth Metal, Ammonia, Amine, monoethanol amine, diethanol amine, triethanol amine, morpholine, imidazole;
a=0.01–0.8;
b=0.2–0.99;
c=0–0.5; and
wherein a, b, c represent the mole fraction of each unit and the sum of a, b, and c, is 1;
i) a random copolymer corresponding to the following Formula (V) in free acid or salt form having the following monomer units and numbers of monomer units:

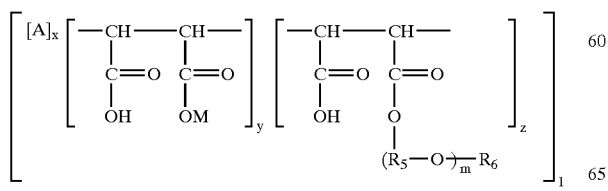

wherein A is selected from the moieties (i) or (ii)

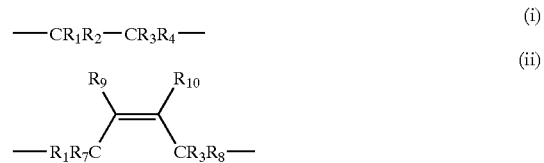

wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;
$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;
M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_mR_6$;
$R_5$ is a $C_{2-8}$ alkylene radical;
$R_6$ is selected from the group consisting of $C_{1-20}$ alkyl, $C_{6-9}$ cycloalkyl and phenyl;
n, x, and z are numbers from 1 to 100;
y is 0 to 100;
m is 2 to 1000;
the ratio of x to (y+z) is from 1:10 to 10:1 and the ratio of y:z is from 5:1 to 1:100;
j) a copolymer of oxyalkyleneglycol-alkenyl ethers and unsaturated dicarboxylic acids, comprising:
i) 0 to 90 mol % of at least one component of the formula 3a or 3b:

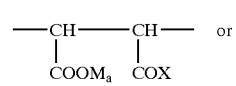

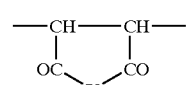

wherein M is a hydrogen atom, a mono- or divalent metal cation, an ammonium ion or an organic amine residue, a is 1, or when M is a divalent metal cation a is ½;
wherein X is —OM$_a$,
O—$(C_mH_{2m}O)_n$—R$^1$ in which R$^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, —NHR$_2$, —N(R$^2$)$_2$ or mixtures thereof in which $R^2$=R$^1$ or —CO—NH$_2$; and
wherein Y is an oxygen atom or —NR$^2$;

ii) 1 to 89 mol % of components of the general formula 4:

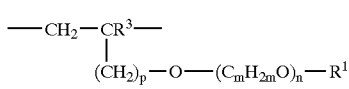
(4)

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is 2 to 4, and n is 0 to 100, and iii) 0.1 to 10 mol % of at least one component of the formula 5a or 5b:

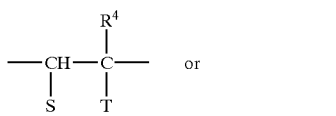
(5a)

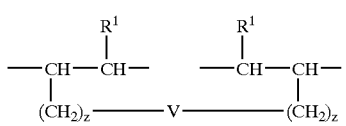
(5b)

wherein S is a hydrogen atom or $-COOM_a$ or $-COOR_5$, T is $-COOR_5$, $-W-R_7$, $-CO-[-NH-(CH2)3)-]_s-W-R_7$, $-CO-O-(CH_2)_z-W-R_7$, a radical of the general formula:

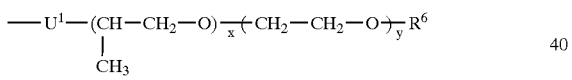

or $-(CH_2)_z-V-(CH_2)_z-CH=CH-R_1$, or when S is $-COOR_5$ or $-COOM_a$, $U_1$ is $-CO-NHM-$, $-O-$ or $-CH_2O$, $U_2$ is $-NH-CO-$, $-O-$ or $-OCH_2$, V is $-O-CO-C_6H_4-CO-O-$ or $-W-$, and W is

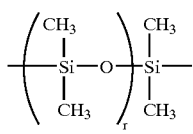

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6=R_1$ or

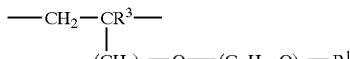

or

-continued

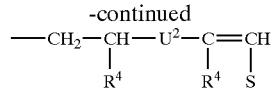

$R_7=R_1$ or

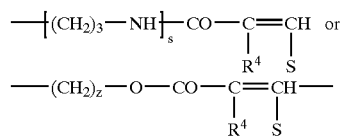

r is 2 to 100, s is 1 or 2, x is 1 to 150, y is 0 to 15 and z is 0 to 4;

iv) 0 to 90 mol % of at least one component of the formula 6a, 6b, or 6c:

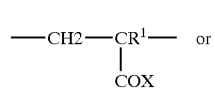
(6a)

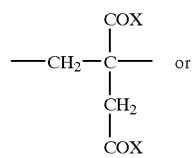
(6b)

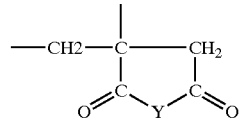
(6c)

wherein M is a hydrogen atom, a mono- or divalent metal cation, an ammonium ion or an organic amine residue, a is 1, or when M is a divalent metal cation a is ½;

wherein X is $-OM_a$,
$-O-(C_mH_{2m}O)_n-R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100,
$-NH-(C_mH_{2m}O)_n-R^1$,
$-NHR_2$, $-N(R^2)_2$ or mixtures thereof in which $R^2=R^1$ or $-CO-NH_2$; and wherein Y is an oxygen atom or $-NR^2$;

k) a copolymer of dicarboxylic acid derivatives and oxyalkylene glycol-alkenyl ethers, comprising:

i) 1 to 90 mol. % of at least one member selected from the group consisting of structural units of Formula 7a and Formula 7b:

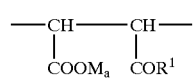
(7a)

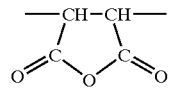
(7b)

wherein M is H, a monovalent metal cation, a divalent metal cation, an ammonium ion or an organic amine;

a is ½ when M is a divalent metal cation or 1 when M is a monovalent metal cation;

wherein $R^1$ is —$OM_a$, or

—O—$(C_mH_{2m}O)_n$—$R^2$ wherein $R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];

m is 2 to 4;

n is 1 to 200;

ii) 0.5 to 80 mol. % of the structural units of Formula 8:

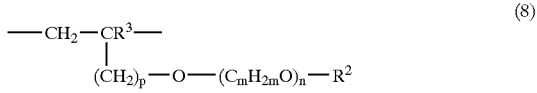

(8)

wherein $R^3$ is H or a $C_{1-5}$ aliphatic hydrocarbon;

p is 0 to 3;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];

m is 2 to 4;

n is 1 to 200;

iii) 0.5 to 80 mol. % structural units selected from the group consisting of Formula 9a and Formula 9b:

(9a)

(9b)

wherein $R^4$ is H, $C_{1-20}$ aliphatic hydrocarbon that is optionally substituted with at least one hydroxyl group, —$(C_mH_{2m}O)_n$—$R^2$, —CO—NH—$R^2$, $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];

M is H, a monovalent metal cation, a divalent metal cation, an ammonium ion or an organic amine;

a is ½ when M is a divalent metal cation or 1 when M is a monovalent metal cation;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of [—$COOM_a$, —$(SO_3)M_a$, and —$(PO_3)M_{a2}$];

m is 2 to 4;

n is 1 to 200;

iv) 1 to 90 mol. % of structural units of Formula 10

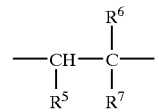

(10)

wherein $R^5$ is methyl, or methylene group, wherein $R^5$ forms one or more 5 to 8 membered rings with $R^7$;

$R^6$ is H, methyl, or ethyl;

$R^7$ is H, a $C_{1-20}$ aliphatic hydrocarbon, a $C_{6-14}$ aryl that is optionally substituted with at least one member selected from the group consisting of [—$COOM_3$, —$(SO_3)M_a$, and —$(PO_3)M_{a2}$], a $C_{5-8}$ cycloaliphatic hydrocarbon, —$OCOR^4$, —$OR^4$, or —$COOR^4$, wherein $R^4$ is H, a $C_{1-20}$ aliphatic hydrocarbon that is optionally substituted with at least one —OH, —$(C_mH_{2m}O)_n$—$R^2$, —CO—NH—$R^2$, $C_{5-8}$ cycloaliphatic hydrocarbon, or a $C_{6-14}$ aryl residue that is optionally substituted with a member selected from the group consisting of [—$COOM_a$, —$(SO_3)M_a$, —$(PO_3)M_{a2}$].

In formula (e) the word "de rived" does not refer to derivatives in general, but rather to any polycarboxylic acid/salt side chain derivatives of oligoalkyleneglycols, polyalcohols, polyoxyalkylene amines, and polyalkylene glycols that are compatible with dispersant properties and do not destroy the graft polymer.

The preferred substituents in the optionally substituted aryl of formula (j), containing 6 to 14 carbon atoms, are hydroxyl, carboxyl, $C_{1-14}$ alkyl, or sulfonate groups.

The preferred substituents in the substituted benzene are hydroxyl, carboxyl, $C_{1-14}$alkyl, or sulfonate groups.

As used herein, the term cement refers to any hydraulic cement. Hydraulic cements are materials which set when mixed with water. Suitable examples of hydraulic cements include, but are not limited to, portland cement, masonry cement, alumina cement, refractory cement, magnesia cement, calcium sulfoaluminate cement, oil well cement, and mixtures thereof.

Pastes are defined as mixtures composed of a hydraulic cement binder, either alone or in combination with pozzolans such as fly ash, silica fume, calcined clay, or blast furnace slag, and water. Mortars are defined as pastes that additionally include fine aggregate. Concretes additionally include coarse aggregate.

An amine solubilizing agent can be combined with a water insoluble defoamer and a dispersant for cementitious compositions to form an admixture for cementitious compositions. The combination of an amine solubilizing agent with a water insoluble defoamer and a dispersant for cementitious compositions provides an admixture that is stable over time in that there is little or no phase separation between the dispersant and defoamers.

Without being limited to theory, it is theorized that some combinations of an amine solubilizing agent with a water insoluble defoamer form a micellar solution. A micellar solution is a single, thermodynamically stable, equilibrium phase; as compared to a macroemulsion, which is a dispersion of large droplets, over 200 to 5,000 nanometers, that contain two or more phases, which are liquids or liquid crystals. Emulsions typically are opaque, thermodynamically unstable, and macro-disperse systems of 0.5 to 10 micron droplet size. Micellar solutions are typically transparent, oil in water systems stabilized by an interfacial layer of surfactants and have a particle size of about 0.01 to about 0.05 microns. The smaller particle size provides for the optical transparency. Further definition of micellar solutions can be found in Microemulsions: Theory and Practice, by L. M. Prince, Academic Press, New York (1977).

Amine solubilizing agents can increase the total aqueous solubilization of oil in an aqueous phase. When a sufficient amount of solubilizer is present in a solution, above the critical micelle concentration, the solubilizer molecules aggregate into micelles. The micelle-water partition coefficient and the molar solubilization ratio can characterize the degree of solubility enhancement achieved by an amine solubilizing agent. The solubilization of the defoamer increases after the amine solubilizing agent reaches the critical micelle concentration. The defoamer diffuses through the aqueous phase to the micelles and dissolves in the core of the micelle. As more solubilizer is added, the shape of the micelles will change to cylinder form. As even more solubilizer is added the shape will eventually change to lamellar. However, the number of micelles will remain about the same throughout these changes.

One method of preparing a stable, micellar solution for cementitious compositions involves adding an amine solubilizing agent to a medium containing an acid wherein the medium can be water or any solution, mixture, or composition that when containing an acid, forms an acid activated amine salt, followed by addition of insoluble defoamer which is solubilized by the amine solubilizing agent, then optionally adding dispersant and any other additives or admixtures.

In another method for producing a stable, micellar solution for cementitious compositions, the amine solubilizing agent, insoluble defoamer, dispersant and any other additives or admixtures can be added in combination to a medium containing an acid, wherein the medium can be water or any solution, mixture, or composition that when containing an acid, forms an acid activated amine salt. By "in combination" is meant the amine solubilizing agent, insoluble defoamer, dispersant and any other additives or admixtures are added to the acidic medium prior to solubilizing the defoamer.

The combination of the amine solubilizing agent, insoluble defoamer, dispersant and any other additives or admixtures typically produces a stable, transparent micellar solution that has an estimated extended stability of several years. Additionally, in the alkaline pH environment of the cementitious composition, the amine solubilizing agent is inactivated to the unprotonated (non-salt) form, and greater defoaming performance is observed.

An activated amine solubilizing agent refers to an amine surfactant that has been reacted with an acid to form a water soluble salt. A deactivated amine solubilizing agent refers to an amine surfactant which is in the unprotonated (non-salt) form.

Examples of the amine solubilizing agents include, but are not limited to, (mono, di, tri) alkyl amine, (mono, di, tri) alkyl ether amine, alkoxylated amine, alkyl amide amine, alkylimidazoline, alkyl (di or tri,) amine, alkyl (di or tri) ether amine, alkoxylated (di or tri) amine, ethoxylated alkyl ether amine, or mixtures thereof.

In one embodiment the ether amines are DA-series ether diamines from Tomah Products, Inc., Milton Wis. and comprise the following formula: R—O—CH$_2$CH$_2$CH$_2$NHCH$_2$CH$_2$CH$_2$NH$_2$. In another embodiment the ether amines have the following formulas: DA-1214 has R as C$_8$H$_{17}$/C$_{10}$H$_{21}$ (Octyl/decyloxypropyl-1,3-diaminopropane); DA-14 has R as Branched C$_{10}$H$_{21}$ (Isodecyloxypropyl-1,3-diaminopropane); DA-16 has R as Branched C$_{12}$H$_{25}$ (Isododecyloxypropyl-1,3-diaminopropane); DA-1618 has R as C$_{12}$H$_{25}$/C$_{14}$H$_{29}$ (Dodecyl/tetradecyloxypropyl-1,3-diaminopropane); DA-17 has R as Branched C$_{13}$H$_{27}$ (Isotridecyloxypropyl-1,3-diaminopropane); and DA-18 has R as C$_{14}$H$_{29}$ (Tetradecyloxypropyl-1,3-diaminopropane).

In one embodiment the ether amines are PA-series primary ether diamines (ethoxylated alkyl diamine and alkyl diamine) from Tomah Products, Inc., Milton Wis. In certain embodiments the primary ether amines have the following formulas: PA-7 has R as Iso C$_3$H$_7$ (isopropyloxypropyl amine); PA-10 has R as Branched C$_6$H$_{13}$ (Isohexyloxypropyl amine); PA-12 EH has R as Branched C$_6$H$_{13}$ (2-ethylhexyloxypropyl amine); PA-1214 has R as C$_8$H$_{17}$/C$_{10}$H$_{21}$ (Octyl/decyloxypropyl amine); PA-14 has R as Branched C$_{10}$H$_{21}$ (Isodecyloxypropyl amine); PA-16 has R as Branched C$_{12}$H$_{25}$ (Isododecyloxypropyl amine); PA-1618 has R as C$_8$H$_{17}$/C$_{10}$H$_{21}$ (Dodecyl/tetradecyloxypropyl amine); PA-17 has R as Branched C$_{13}$H$_{27}$ (Isotridecyloxypropyl amine); PA-18 has R as C$_{14}$H$_{29}$ (Tetradecyloxypropyl amine); PA-1816 has R as C$_{14}$H$_{29}$/C$_{12}$H$_{25}$ (Tetradecyl/dodecyloxypropyl amine); PA-19 has R as C$_{12}$H$_{25}$/C$_{15}$H$_{31}$ (Linear alkyloxypropyl amine); and PA-2220 has R as C$_{18}$H$_{37}$/C$_{16}$H$_{33}$ (Octadecyl/hexadecyloxypropyl amine).

In one embodiment the ethoxylated ether amines are E-series ethoxylated ether amines from Tomah Products, Inc., Milton Wis. and comprise the following formula:

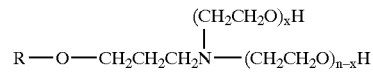

$$R-O-CH_2CH_2CH_2N\overset{\displaystyle (CH_2CH_2O)_xH}{\underset{}{\phantom{|}}}-(CH_2CH_2O)_{n-x}H$$

In certain embodiments the ethoxylated ether amines have the following formulas: E-14-2 has R as Branched C$_{10}$H$_{21}$ (iso-(2-hydroxyethyl) isodecyloxypropylamine); E-14-5 has R as Branched C$_{10}$H$_{21}$ (poly (5) oxyethylene isodecyloxypropylamine); E-17-2 has R as Branched C$_{13}$H$_{27}$ (bis-(2-hydroxyethyl) isotridecyloxypropylamine); E17-5 has R as Branched C$_{13}$H$_{27}$ (poly (5) oxyethylene isotridecyloxypropylamine); E19-2 has R as C$_{12}$H$_{25}$/C$_{15}$H$_{31}$ (bis-(2-hydroxyethyl) linear C12–15 alkyloxypropylamine); E-22-2, E-2220-2 and E-18-2 has R as C$_{18}$H$_{27}$ (bis-(2-hydroxyethyl) octadecylamine (&5, 15 mole adduct)); E-S-2 has R as Oleic/Linoleic (bis-(2-hydroxyethyl) soya amine (&15 mole adduct)); E-T-2 has R as Stearic/Oleic (bis-(2-hydroxyethyl) tallow amine (&5, 15 mole adduct)).

In one embodiment the amine solubilizing agent has a molecular weight of about 100 to about 1000.

Illustrative examples of amine solubilizing agents capable of controlling the air content in cementitious compositions that can be used are di coco alkylamine, tridodecyl amine, oleyl dimethyl amine, hydrogenated tallow dimethyl amine, oleyl amine, tallow amine, dodecyl ether amine or tetradecyl ether amine, ethoxylated(2)cocoalkyl amine, propoxylated (2)tallowalkyl amine, bis (2-hydroxyethyl)oleyl amine, bis (2-hydroxyethyl)octadecyl amine, polyoxyethylene(15) tallowalkyl amine, bis (2-hydroxyethyl)cocoalkyl amine or N-oleyl-1,1-iminobis-2-propanol, lauramidopropyl dimethylamine, stearamidopropyl dimethylamine or oleamidopropyl dimethylamine, 1-(2-hydroxyethyl)-2-(heptadecenyl)imidazoline, oleyl hydroxyethylimidazoline, or cocoalkyl hydroxyethyl imididazoline, oleyl diamine, tallow pentamine, tallow tetramine, tallow triamine, N-oleyl-1,3-diaminopropane, tris(2-hydroxyethyl)-N-tallowalkyl-1,3-diaminopropane, iso tridecyloxypropyl-1,3-diaminopropane or tetra decyloxypropyl-1,3- diaminopropane, ethoxylated(3)N-tallow-1,3-diaminopropane, and mixtures thereof.

"Solubilized" refers to the aggregation or self assembly micellization of surfactant in water in which a water insoluble species resides and particle sizes are small enough to provide optical transparency. "Soluble" refers to the interaction of an individual molecule with water.

Amine solubilizing agents according to the present invention preferably are at least partially effective themselves as defoamers for cementitious compositions. But, the combination of amine solubilizing agents and insoluble defoamers provide increased air control in cementitious mixtures over use of amine solubilizing agents alone.

The amount of the dispersant for cementitious compositions that is present in the admixture ranges from about 0 to about 60% based on the weight of dry solids. The amount of the dispersant for cementitious compositions that is present in a cementitious mixture ranges from about 0% to about 2.0% primary active ingredient based on the dry weight of cementitious material. Preferably, the amount of dispersant for cementitious compositions that is present in a cementitious mixture ranges from about 0.05% to about 0.5% primary active ingredient based on the dry weight of cementitious material.

The amount of amine solubilizing agent that is present in the admixture is at least the amount sufficient to obtain a stable solution. Preferably the amount of amine solubilizing agent that is present in the admixture is from about 0.02% to about 60% based on the weight of dry solids. Preferably the amount of amine solubilizing agent that is present in a cementitious mixture ranges from about 0.0001% to about 0.2% primary active ingredient based on the dry weight of cementitious material.

The amount of water insoluble defoamer that is present in the admixture ranges from about 0.02% to about 30% based on weight of dry solids. Preferably, the amount of water insoluble defoamer that is present in the admixture ranges from about 0.25% to about 10% based on weight of dry solids. Preferably the amount of water insoluble defoamer that is present in a cementitious mixture ranges from about 0.0001% to about 0.1% primary active ingredient based on the dry weight of cementitious material.

The amount of acid that is present in the admixture is at least the amount sufficient to form an acid activated water soluble amine salt. Preferably the amount of acid that is present in the admixture is from 0 to about 25% based on the weight of dry solids. Preferably the amount of acid that is present in a cementitious mixture ranges from 0 to about 2% primary active ingredient based on the dry weight of cementitious material. In some embodiments the acidic medium used to form an acid activated water soluble amine salt is provided by dispersants.

The weight ratio of amine solubilizing agent to insoluble defoamer ranges from about 0.25:1 to about 5:1.

Examples of water insoluble defoamers useful to control the air content in cementitious compositions include, but are not limited to, chemicals based on mineral or vegetable oils, fats and oils, fatty acid esters, any chemical with —OH (hydroxyl) functionality (such as alcohols, particularly fatty alcohols), ether compounds, phosphoric esters, silicones, polyoxyalkylenes, polymers comprising ethylene oxide and/or propylene oxide moieties, liquid hydrocarbons, and acetylenic compounds.

Suitable examples of the water insoluble defoamers useful to control the air content in cementitious compositions include DYNOL™ 604, SURFYNOL® 440, SURFYNOL® 104, SURFYNOL® 2502, SURFYNOL® 420, SUR-FYNOL® DF-75, nonyl phenol, ethoxylated nonyl phenol, tributyl phosphate, triisobutyl phosphate, and polypropylene oxide.

Further examples of water insoluble defoamers include the following: kerosene, liquid paraffin, animal oil, vegetable oil, sesame oil, castor oil, alkylene oxide adducts thereof, natural wax, linear or branched fatty alcohols and their alkoxylated derivatives, octyl alcohol, hexadecyl alcohol, acetylene alcohol, acetylinic alcohol alkoxylates, glycols, polyoxyalkylene glycol, polyoxyalkylene amide, acrylate polyamine, silicone oil, silicone paste, silicone emulsion, organic modified polysiloxane, fluorosilicone oil; and polyoxyethylene polyoxypropylene adducts. To the extent that the defoamers in the preceding list contain alkylene oxides, reference is made to those (longer chain polyalkylene oxides) that are water insoluble.

Elevated temperature stability for any combination of insoluble defoamer and dispersant for cementitious compositions can be obtained by increasing the level of the amine solubilizing agent or reducing the amount of insoluble defoamer. For example, depending upon the insoluble defoamer level and the effectiveness of the amine solubilizing agent, a temperature increase from 25° C. to 45° C. may possibly need a 10–20% increase in the amount of amine solubilizing agent to maintain a stable solution.

The admixture of the present invention can be used in combination with any other admixture or additive for cement. Other cement admixtures and additives include, but are not limited to, set retarders, set accelerators, air-entraining or air detraining agents, corrosion inhibitors, any other dispersants for cement, pigments, wetting agents, water soluble polymers, strength enhancing agents, rheology modifying agents, water repellents, and any other admixture or additive that does not adversely affect the properties of the admixture of the present invention.

Other dispersants for cement include, but are not limited to, calcium lignosulfonates, beta naphthalene sulfonates, sulfonated melamine formaldehyde condensates, any other chemical that functions as a dispersant or water reducer or superplasticizer for cement, and mixtures thereof.

Listed below are several examples of admixtures and additives that can be used with the present invention. U.S. Pat. No. 5,728,209 to Bury et al., which is incorporated herein by reference, contains a detailed description of different types of admixtures.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from salts of wood resin; (Vinsol resin); some synthetic detergents; salts of sulfonated lignin; salts of petroleum acids; salts of proteinaceous material; fatty and resinous acids and their salts; alkylbenzene sulfonates; and salts of sulfonated hydrocarbons. Air entrainers are added in an amount to yield a desired level of air in a cementitious composition. Generally, the amount of air entrainers in a cementitious composition ranges from about 0.2 to about 5.0 fluid ounces per hundred pounds of cementitious material. But this can vary widely due to variations in materials, mix proportion, temperature, and mixing action.

Retarding, or delayed-setting, admixtures are used to retard, delay, or slow the rate of setting of concrete. They can be added to the concrete mix upon initial batching or sometime after the hydration process has begun. Retarders are used to offset the accelerating effect of hot weather on the setting of concrete, or delay the initial set of concrete or grout when difficult conditions of placement occur, or problems of delivery to the job site, or to allow time for special finishing processes or to aid in the reclamation of concrete left over at the end of the work day. Most retarders also act as water reducers and can also be used to entrain some air into concrete. The retarder used in the admixture of the present invention can include, but is not limited to an oxy-boron compound, lignin, a polyphosphonic acid, a carboxylic acid, a hydroxycarboxylic acid, polycarboxylic acid, hydroxylated carboxylic acid, fumaric, itaconic, malonic, borax, gluconic, and tartaric acid, lignosulfonates, ascorbic acid, isoascorbic acid, sulphonic acid-acrylic acid copolymer, and their corresponding salts, polyhydroxysilane, polyacrylamide, carbohydrates and mixtures thereof. Illustrative examples of retarders are set forth in U.S. Pat. Nos. 5,427,617 and 5,203,919, incorporated herein by reference. A further example of a retarder particularly suited for use in the present invention is a hydration control admixture sold under the trademark DELVO® by Master Builders Inc. of Cleveland, Ohio.

Air detrainers are used to decrease the air content in the mixture of concrete. Dibutyl phthalate, octyl alcohol, water-insoluble esters of carbonic and boric acid, and silicones are some of the common materials that can be used to achieve this effect.

Alkali-reactivity reducers can reduce the alkali-aggregate reaction and limit the disruptive expansion forces in hardened concrete. Pozzolans (fly ash, silica fume), blast-furnace slag, salts of lithium and barium are especially effective.

Bonding admixtures are usually added to portland cement mixtures to increase the bond strength between old and new concrete and include organic materials such as rubber, polyvinyl chloride, polyvinyl acetate, acrylics, styrene butadiene copolymers, and other powdered polymers.

Water-reducing admixtures are used to reduce the amount of mixing water required to produce concrete of a certain slump, to reduce the ratio of water and cementitious material, or to increase slump. Typically, water reducers will reduce the water content of the concrete mixture by approximately up to 15%.

Superplasticizers are high-range water reducers, or water-reducing admixtures. They are added to concrete to make high-slump, flowing concrete, and thus reduce the water-cementitious material ratio. These admixtures produce large water reduction or great flowability without causing undue set retardation or entrainment of air in mortar or concrete. Among the materials that can be used as superplasticizers are sulfonated melamine formaldehyde condensates, sulfonated naphthalene formaldehyde condensates, certain organic acids, lignosulfonates, and/or blends thereof.

Natural and synthetic admixtures are used to color concrete for aesthetic and safety reasons. These coloring admixtures are usually composed of pigments and include carbon black, iron oxide, phthalocyanine, umber, chromium oxide, titanium oxide and cobalt blue.

Corrosion inhibitors in concrete serve to protect embedded reinforcing steel from corrosion due to its highly alkaline nature. The high alkaline nature of the concrete causes a passive and noncorroding protective oxide film to form on the steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that have low cement contents, high water-cementitious material ratios, or a deficiency of fines in the aggregate. These admixtures retard moisture penetration into dry concrete and include certain soaps, stearates, and petroleum products.

Grouting agents, such as air-entraining admixtures, accelerators, retarders, and non-shrink and workability agents, adjust grout properties to achieve a desired result for specific applications. For example, portland cement grouts are used for a variety of different purposes, each of which may require a different agent to stabilize foundations, set machine bases, fill cracks and joints in concrete work, cement oil wells, fill cores of masonry walls, grout pre-stressing tendons and anchor bolts, or fill the voids in pre-placed aggregate concrete.

Gas formers, or gas-forming agents, are sometimes added to concrete and grout in very small quantities to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers.

Permeability reducers are used to reduce the rate at which water under pressure is transmitted through concrete. Silica fume, fly ash, ground slag, natural pozzolans, water reducers, and latex can be employed to decrease the permeability of the concrete. Pozzolan is a siliceous or siliceous and aluminous material, which in itself possesses little or no cementitious value. However, in finely divided form and in the presence of moisture, pozzolan will chemically react with calcium hydroxide at ordinary temperatures to form compounds possessing cementitious properties.

Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Fresh concrete can sometimes be harsh because of faulty mixture proportions or certain aggregate characteristics such as particle shape and improper grading. Under these conditions, entrained air which acts like a lubricant, can be used as a workability improving agent. Other workability agents are water reducers and certain finely divided admixtures.

Finely divided mineral admixtures are materials in powder or pulverized form added to concrete before or during the mixing process to improve or change some of the plastic or hardened properties of portland cement concrete. Portland cement, as used in the trade, means a hydraulic cement produced by pulverizing clinker, consisting essentially of hydraulic calcium silicates, all usually containing one or more of the forms of calcium sulfate as an interground addition with ASTM types, I, II, III, IV, or V. The finely divided mineral admixtures can be classified according to their chemical or physical properties as: cementitious materials; such as pozzolans; pozzolanic and cementitious materials; and nominally inert materials. Cementitious materials are materials that alone have hydraulic cementing properties, and set and harden in the presence of water. Included in cementitious materials are ground granulated blast-furnace slag, natural cement, hydraulic hydrated lime, and combinations of these and other materials. As discussed above, pozzolan is a siliceous or aluminosiliceous material that possesses little or no cementitious value but will, in the presence of water and in finely divided form, chemically react with the calcium hydroxide released by the hydration of portland cement to form materials with cementitious properties. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C-618.

In the construction field, many methods of strengthening concrete have been developed through the years. One modem method involves distributing fibers throughout a fresh concrete mixture. Upon hardening, this concrete is referred to as fiber-reinforced concrete. Fibers can be made of zirconium materials, steel, fiberglass, or synthetic materials, e.g., polypropylene, nylon, polyethylene, polyester, rayon, high-strength aramid, (i.e. KEVLAR®), or mixtures thereof.

A cementitious composition having controlled air content can be formed which comprises cementitious material, water, a water insoluble defoamer, a dispersant for cementitious compositions, and an amine solubilizing agent that solubilizes the water insoluble defoamer. The cementitious material can include fine aggregates, coarse aggregates, pozzolans, air (either entrapped or purposefully entrained), calcined clay, and pigments.

The fine aggregates are materials that pass through a Number 4 sieve (ASTM C125 and ASTM C33), such as natural or manufactured sand. The coarse aggregates are materials that are retained on a Number 4 sieve (ASTM C125 and ASTM C33), such as silica, quartz, crushed round marble, glass spheres, granite, limestone, calcite, feldspar, alluvial sands, or any other durable aggregate, and mixtures thereof.

A method of controlling air in a cementitious composition is also provided according to the present invention which comprises mixing cementitious material, water, a water insoluble defoamer, an amine solubilizing agent that solubilizes the water insoluble defoamer, and optionally a dispersant for cementitious compositions. Other admixtures and additives are added to the cementitious composition at appropriate times prior or subsequent to the addition of the inventive admixture.

The amount of water added to the cementitious composition is calculated based on the desired water to cementitious material (W/C) ratio. The water to cementitious material ratio typically ranges from about 0.2 to about 0.7 with the water and cementitious material being measured by weight.

SPECIFIC EMBODIMENTS OF THE INVENTION

Samples of micellar solutions and cementitious compositions were prepared using different insoluble defoamers, solubilizing agents, acids and dispersants for cementitious compositions. The cementitious compositions additionally contained cement and aggregate. The dispersant for cementitious compositions used in the following examples was a polycarboxylate dispersant, which was a polymer with polymeric carboxylate backbone with polyether side chains.

The following tests were used: Slump (ASTM C143) and Air content-volumetric (ASTM C231). Aggregates met the specifications of ASTM C33. The term W/C refers to the water to cementitious material ratio in a cementitious mixture. The term S/A refers to the sand to aggregate ratio by volume.

Solution Samples

To determine which amines would function as solubilizing agents, solutions were prepared that comprised water, an insoluble defoamer, amine solubilizing agent, acid, and optionally polycarboxylate dispersant, shown below in Tables 1 and 2. The amounts of the materials are shown as percent by weight of the solution. The solutions were prepared initially by combining water, acid, amine solubilizing agent, insoluble defoamer, and optionally polycarboxylate dispersant (Table 2), with continuous stirring with a magnetic stir bar in a glass beaker. Another method of preparation involved adding all of the components to the beaker at the same time and stirring until a clear solution was obtained.

Samples S1–S51 were prepared as described above with all samples comprising from 3 to 8% insoluble defoamer, an amine solubilizing agent, sufficient acid to render the amine solubilizing agent active, and no polycarboxylate dispersant.

TABLE 1

| Sample # | Def. | Def. % by wt. | ASA | ASA/Def. by wt. | Acid | Acid % by wt. | Solution Appearance | Stability (at X days) |
|---|---|---|---|---|---|---|---|---|
| S1 | PO 1000 | 6 | Oleyl Amine 2EO | 2:1 | acetic | 2.60 | clear | stable @ 148 |
| S2 | PO 2000 | 6 | Oleyl Amine 2EO | 2:1 | acetic | 2.60 | clear | stable @ 148 |
| S3 | PO 2000 | 6 | Tallow Amine 2EO | 1.5:1 | acetic | 1.20 | clear | stable @ 98 |
| S4 | PO 2000 | 6 | Tallow Amine 5EO | 1.5:1 | acetic | 1.20 | cloudy | stable @ 98 |
| S5 | S-420 | 6 | Tallow Amine 2EO | 1.5:1 | acetic | 2.40 | clear | stable @ 96 |
| S6 | S-420 | 6 | Tallow Amine 5EO | 1.5:1 | acetic | 1.20 | clear | stable @ 96 |
| S7 | S-420 | 6 | Tallow Amine 5EO | 1.25:1 | acetic | 1.00 | clear | stable @ 96 |
| S8 | S-420 | 6 | Oleyl Amine 2EO | 1.5:1 | acetic | 1.95 | clear | stable @ 96 |
| S9 | S-420 | 4 | 1-hydroxyethyl-2- | 1:1 | acetic | 2.00 | clear | stable @ 96 |

TABLE 1-continued

| Sample # | Def. | Def. % by wt. | ASA | ASA/Def. by wt. | Acid | Acid % by wt. | Solution Appearance | Stability (at X days) |
|---|---|---|---|---|---|---|---|---|
| | | | tall oil alkylimidazoline | | | | | |
| S10 | S-440 | 6 | Tallow Amine 2EO | 1.5:1 | acetic | 2.40 | clear | stable @ 98 |
| S11 | S-440 | 6 | Tallow Amine 5EO | 1.25:1 | acetic | 1.00 | clear | stable @ 98 |
| S12 | S-440 | 6 | Oleyl Amine 2EO | 1.5:1 | acetic | 1.95 | clear | stable @ 98 |
| S13 | TBP | 4 | Tallow Amine 5EO | 3:1 | gluconic | 8.00 | clear | stable @ 175 |
| S14 | TBP | 8 | Oleyl Amine 2EO | 1.5:1 | acetic | 2.60 | clear | stable @ 169 |
| S15 | TBP | 4 | Tallow Amine 5EO | 3:1 | acetic | 1.60 | clear | |
| S16 | TBP | 6 | Oleyl Amine 2EO | 2:1 | acetic | 2.60 | clear | stable @ 147 |
| S17 | TBP | 6 | Olcyl Amine 2EO | 2.5:1 | acetic | 3.25 | clear | stable @ 152 |
| S18 | TBP | 6 | oleamidopropyl dimethyl amine | 2:1 | acetic | 2.60 | clear | stable @ 148 |
| S19 | TBP | 4.286 | oleamidopropyl dimethyl amine | 2.5:1 | acetic | 2.32 | clear | stable @ 147 |
| S20 | TBP | 4 | Tallow Amine 5EO | 2:1 | acetic | 1.07 | clear | stable @ 148 |
| S21 | TBP | 3.967 | Tallow Amine 2EO | 2:1 | acetic | 2.02 | clear | stable @ 147 |
| S22 | TBP | 3.94 | Tallow Amine 2EO | 3:1 | acetic | 3.27 | clear | stable @ 147 |
| S23 | TBP | 4 | Tallow Amine 2EO | 1.5:1 | Acetic | 1.65 | clear | stable @ 70 |
| S24 | TBP | 49 | Tallow Amine 2EO + Tallow Amine 5EO | 3:1 | acetic | 3.30 | clear | stable @ 124 |
| S25 | TBP | 4 | Tallow Amine 2EO + Tallow Amine 5EO | 3:1 | acetic | 3.30 | clear | stable @ 140 |
| S26 | TBP | 4 | Tallow Amine 2EO | 3.5:1 | acetic | 3.91 | clear | stable @ 107 |
| S27 | TBP | 4 | Tallow Amine 2EO | 4:1 | acetic | 4.47 | clear | stable @ 107 |
| S28 | TBP | 4 | Tallow Amine 2EO | 1.75:1 | acetic | 1.93 | clear | stable @ 90 |
| S29 | TBP | 4 | Tallow Amine 5EO | 1.75:1 | acetic | 0.94 | clear | stable @ 89 |
| S30 | TBP | 8 | oleamidopropyl dimethyl amine | 1.5:1 | acetic | 2.60 | clear | |
| S31 | TBP | 4 | Tallow Amine 5EO | 1.5:1 | acetic | 1 | Cloudy | |
| S32 | TBP | 6 | Tallow Amine 5EO | 2:1 | Acetic | 1.61 | clear | stable @ 137 |
| S33 | TBP | 4 | Tallow Amine 15EO | 1.5.1 | acetic | 1 | Cloudy | |
| S34 | TBP | 4 | Tallow Amine 15EO | 2.5:1 | acetic | 1 | Clear | |
| S35 | TBP | 3 | Tallow Triamine | 3:1 | acetic | 6.00 | clear | stable @ 63 |
| S36 | TBP | 4 | Tallow Amine 2EO | 1.5:1 | acetic | 2.40 | clear | stable @ 96 |
| S37 | TBP | 4 | None | — | — | — | Cloudy/Sep | |
| S38 | TBP | 4 | Oleyl Amine 2EO | 1.5:1 | acetic | 1 | Clear | |
| S39 | TBP | 4 | Tallow Amine 2EO | 1.5:1 | acetic | 1 | Clear | |
| S40 | TBP | 4 | Tallow Amine 2PO | 1.5:1 | acetic | 1 | Clear | |
| S41 | TBP | 4 | 1-hydroxyethyl-2-oleylimidazoline | 1.5: | acetic | 1 | Clear | |
| S42 | TBP | 4 | 1-hydroxyethyl-2-cocoimidazoline | 1.5:1 | acetic | 1 | Clear | |
| S43 | TBP | 4 | oleamidopropyl dimethyl amine | 1.5:1 | acetic | 1 | Clear | |
| S44 | TBP | 4 | stearamidopropyl dimethyl amine | 1.5:1 | acetic | 1 | Clear | |
| S45 | TBP | 4 | lauramidopropyl dimethyl amine | 1.5:1 | acetic | 1 | Clear | |
| S46 | S-440 | 5 | Oleyl Amine 2EO | 1.5:1 | acetic | 1 | Clear | stable > 30 |
| S47 | TBP | 5 | Oleyl Amine 2EO | 1.5:1 | acetic | 1 | Clear | stable > 30 |
| S48 | Surfynol 104H | 5 | Oleyl Amine 2EO | 1.5:1 | acetic | 1 | Clear | stable > 30 |
| S49 | S-420 | 5 | Oleyl Amine 2EO | 1.5:1 | acetic | 1 | Clear | stable > 30 |
| S50 | S-2502 | 5 | Oleyl Amine 2EO | 1.5:1 | acetic | 1 | Clear | stable > 30 |
| S51 | D-604 | 5 | Oleyl Amine 2EO | 1.5:1 | acetic | 1 | Clear | stable > 30 |

ASA = amine solubilizing agent
Def = defoamer
TBP = tributylphosphate
TIBP = Triisobutyl phosphate
S-440 = Surfynol 440
S-420 = Surfynol 440
S-2502 = Surfynol 2502
D-604 = Dynol 604
PO-1000 = polypropylene glycol mw1000
PO-2000 = polypropylene glycol mw2000

Samples S1–3, S5–30, S32, S34–36, and S38–51 show that stable micellar solutions were produced by using various amine solubilizing agents in combination with different insoluble defoamers. The cloudy solution of the control (S37) which did not have an amine solubilizing agent demonstrates that the insoluble defoamer was not stabilized and separation was immediate. Comparison of samples S31 and S33 versus S32 and S34 shows that the ratio of amine solubilizing agent to insoluble defoamer can be optimized in order to obtain a stable solution.

Samples S52–S73 were prepared as described above with all samples comprising one of four different polycarboxylate dispersants (PC-1,2 & 3 are polymers having shorter (lower molecular weight) PEG side chains and different charge densities and PC-4 has longer PEG side chains), 0.1 to 1.6% insoluble defoamer by weight of solution, amine solubilizing agent, and sufficient acid to render the amine solubilizing agent active.

Samples S52–S73 illustrate that, in the presence of different polycarboxylate dispersants, various amines solubilized an insoluble defoamer in an acidic medium to form a stable, transparent solution. While solution clarity is preferable for indicating the best long-term solution stability, the nature of the polycarboxylate dispersant can influence solution clarity. However, cloudy solutions with adequate stability can also be obtained using the amine solubilizing agents as demonstrated by Samples S72 and S73.

Samples in Table 3 were prepared as described above with all samples comprising 20% polycarboxylate dispersant. The insoluble defoamer used was the commercially available product S-440 (SURFYNOL® 440) from Air Products and Chemicals, Allentown, Pa. which is a 40% ethylene oxide adduct to 2,4,7,9-tetramethyl-5-decyne-4,7-diol.

TABLE 2

| Sample # | Disp. | Disp. % by wt. | Def. | Def. % by wt. | ASA | ASA/Def by wt. | Acid | Acid % by wt. | Solution Appearance | Stability (at X days) |
|---|---|---|---|---|---|---|---|---|---|---|
| S52 | PC-1 | 20 | TBP | 1.00 | Dodecyl Amine | 2:1 | acetic | 1 | Clear | stable > 30 |
| S53 | PC-1 | 20 | TBP | 1.00 | Oleyl Amine | 2:1 | acetic | 1 | Clear | stable > 30 |
| S54 | PC-1 | 20 | TBP | 1.00 | Oleyl Amine 2EO | 2:1 | acetic | 1 | Clear | stable > 30 |
| S55 | PC-1 | 20 | TBP | 1.00 | Steayl Amine 2EO | 2:1 | acetic | 1 | Clear | stable > 30 |
| S56 | PC-1 | 20 | TBP | 1.00 | Tallow Amine 2EO | 2:1 | acetic | 1 | Clear | stable > 30 |
| S57 | PC-1 | 20 | TBP | 1.00 | Tallow Amine 5EO | 2:1 | acetic | 1 | Clear | stable > 30 |
| S58 | PC-2 | 20 | S-440 | 0.10 | None | 0 | None | 0 | Clear | stable > 30 |
| S59 | PC-2 | 20 | S-440 | 0.20 | None | 0 | None | 0 | Clear | stable > 30 |
| S60 | PC-2 | 20 | S-440 | 0.40 | Oleyl Amine 2EO | 1.5:1 | acetic | 5 | Clear | stable > 30 |
| S61 | PC-2 | 20 | S-440 | 0.40 | Dodecydimethylmaine | 1.5:1 | acetic | 0 | Clear | stable > 30 |
| S62 | PC-2 | 20 | S-440 | 0.60 | Oleyl Amine 2EO | 1.5:1 | acetic | 5 | Clear | stable > 30 |
| S63 | P0-2 | 20 | S-440 | 0.80 | Oleyl Amine 2EO | 1.5:1 | acetic | 5 | Clear | stable > 30 |
| S64 | PC-2 | 20 | S-440 | 1.00 | Oleyl Amine 2EO | 1.5:1 | acetic | 5 | Clear | stable > 30 |
| S65 | PC-2 | 20 | S-440 | 1.60 | Oleyl Amine 2EO | 1.5:1 | acetic | 5 | Clear | stable > 30 |
| S66 | PC-2 | 20 | 75% S-440 + 25% TBP | 0.80 | Oleyl Amine 2EO | 1.5:1 | acetic | 6.6 | Clear | stable > 30 |
| S67 | PC-2 | 20 | 98% S-440 + 2% TBP | 1.02 | Oleyl Amine 2EO | 1.5:1 | acetic | 6.6 | Clear | stable > 30 |
| S68 | PC-2 | 20 | 95% S-440 + 5% TBP | 1.05 | Oleyl Amine 2EO | 1.5:1 | acetic | 6.6 | Clear | stable > 30 |
| S69 | PC-2 | 20 | 91% S-440 + 9% TBP | 1.10 | Oleyl Amine 2EO | 1.5:1 | acetic | 6.6 | Clear | stable > 30 |
| S70 | PC-2 | 20 | 91% 5-440 + 9% TBP | 1.10 | Oleyl Amine 2EO | 1.5:1 | acetic | 6.6 | Clear | stable > 30 |
| S71 | PC-1 | 25 | TBP | 1.00 | Hexadecyl dimethylamine | 2:1 | acetic | 0.8 | Clear | stable > 30 |
| S72 | PC-3 | 25 | TBP | 1.00 | Oleyl Amine 2EO | 1.5:1 | acetic | 0.6 | Cloudy | stable @ 140 |
| S73 | PC-4 | 20 | S-440 | 0.20 | Oleyl Amine 2EO | 1.5:1 | acetic | 0.5 | Cloudy | stable @ 15 |

ASA = amine solubilizing agent
Disp. = dispersant
Def = defoamer
TBP = tributylphosphate
S-440 = Surfynol 440

TABLE 3

| Sample | Def | Def % (by wt) | ASA | ASA/Def (by wt) | Acid | Acid % (by wt) | Solution Appearance |
|---|---|---|---|---|---|---|---|
| S58 | S-440 | 0.10 | None | 0 | None | 0 | Clear |
| S59 | S-440 | 0.20 | None | 0 | None | 0 | Clear |

TABLE 3-continued

| Sample | Def | Def % (by wt) | ASA | ASA/Def (by wt) | Acid | Acid % (by wt) | Solution Appearance |
|---|---|---|---|---|---|---|---|
| S74 | S-440 | 1.00 | None | 0 | None | 0 | Cloudy |
| S75 | S-440 | 0.40 | Oleyl Amine 2EO | 1.5:1 | Acetic | 1 | Hazy |
| S76 | S-440 | 0.60 | Oleyl Amine 2EO | 1.5:1 | Acetic | 1 | Hazy |
| S77 | S-440 | 0.80 | Oleyl Amine 2EO | 1.5:1 | Acetic | 1 | Hazy |
| S78 | S-440 | 1.00 | Oleyl Amine 2EO | 1.5:1 | Acetic | 1 | Hazy |
| S79 | S-440 | 1.60 | Oleyl Amine 2EO | 1.5:1 | Acetic | 1 | Hazy |
| S60 | S-440 | 0.40 | Oleyl Amine 2EO | 1.5:1 | Acetic | 5 | Clear |
| S62 | S-440 | 0.60 | Oleyl Amine 2EO | 1.5:1 | Acetic | 5 | Clear |
| S63 | S-440 | 0.80 | Oleyl Amine 2EO | 1.5:1 | Acetic | 5 | Clear |
| S64 | S-440 | 1.00 | Oleyl Amine 2EO | 1.5:1 | Acetic | 5 | Clear |
| S65 | S-440 | 1.60 | Oleyl Amine 2EO | 1.5:1 | Acetic | 5 | Clear |

S-440 = SURFYNOL ® 440
ASA = amine solubilizing agent
Def = defoamer

The Samples in Table 3 illustrate that in solutions without solubilizing agents, increasing amounts of insoluble defoamer (above 0.20%) made the solution cloudy (S74) due to the separate phase created by the unsolubilzed defoamer. The results show that by increasing the amount of acid in solution, a typical stable transparent mixture is obtained without further increases in amine solubilizing agent. This is demonstrated by samples S60–S64 which solubilized the insoluble defoamer and had the same amounts of surfactant and defoamer as samples S75–S79, but had a greater amount of acid (5% compared to 1% by weight).

Concrete Performance Examples

The concrete mixture proportions for the examples shown in Tables 4–8 were based on a 600 lb/yd$^3$ cement factor mixture using Type I portland cement, a sand to aggregate (S/A) ratio of 0.42 to 0.45 using limestone coarse aggregate and natural sand, and a water to cement (W/C) ratio of 0.4 to 0.5. All of the values shown are expressed as percent active material by cement weight in the concrete mixture.

Tables 4 and 5 show the performance of various amine solubilizing agents over a concrete temperature range of 50–70° F., with and without additional defoamer, in cementitious mixtures containing a polycarboxylate dispersant. The mixtures in Table 4 do not contain an air-entraining agent, the mixtures in Table 5 were air-entrained using a commercially available, proprietary product, Micro-Air® admixture, manufactured by Master Builders, Inc. Cleveland, Ohio. The amine solubilizing agent dosage was fixed at 0.0091% by cement weight and the defoamer dosage, when used, was 0.0061% by cement weight resulting in an amine solubilizing agent (ASA) to defoamer ratio of 1.5:1. In these examples, each component was added separately to the cementitious mixture at the beginning of the mix sequence.

Table 6 shows air-entrained mixtures using Micro-Air admixture and a low dose of polycarboxylate dispersant comparing the addition of only defoamer, at 0.0032% by weight based on the weight of cement, to that of a combination of amine solubilizing agent and defoamer at a 1:1 ratio. In these examples, each component was added separately to the cementitious mixture at the beginning of the mix sequence.

TABLE 4

| Sample | S80 | S81 | S82 | S83 | S84 | S85 | S86 | S87 | S88 | S89 |
|---|---|---|---|---|---|---|---|---|---|---|
| ASA | None | Oleyl Amine 2EO | Oleyl Amine 2EO | Decyl Amine 2EO | Decyl Amine 2EO | None | Oleyl Amine 2EO | Oleyl Amine 2EO | Tallow Amine 2EO | Tallow Amine 2EO |
| Temperature | 50 | 50 | 50 | 50 | 50 | 70 | 70 | 70 | 70 | 70 |
| PC Dose | 0.16 | 0.16 | 0.16 | 0.16 | 0.16 | 0.16 | 0.16 | 0.16 | 0.16 | 0.16 |
| Def | none | none | TBP | none | TBP | none | none | TBP | none | TBP |
| Slump (in) | 6.25 | 6.25 | 6.00 | 5.75 | 6.50 | 6.00 | 6.25 | 6.50 | 6.50 | 6.25 |
| % Air (Volumetric) | 4.3 | 4.3 | 2.3 | 3.6 | 2.1 | 3.7 | 3.7 | 2.3 | 3.6 | 2.4 |

PC = polycarboxylate dispersant
ASA = amine solubilizing agent
Def = Defoamer

TABLE 5

| Sample | S90 | S91 | S92 | S93 | S94 | S95 |
|---|---|---|---|---|---|---|
| ASA | None | Oleyl Amine 2EO | Oleyl Amine 2EO | None | Dodecyl Dimethyl Amine | Dodecyl Dimethyl Amine |
| Temperature | 50 | 50 | 50 | 70 | 70 | 70 |
| PC Dose | 0.16 | 0.16 | 0.16 | 0.16 | 0.16 | 0.16 |
| Def | none | none | TBP | none | none | TBP |
| AE-agent (fl.oz/cwt) | 0.6 | 0.6 | 0.6 | 0.6 | 0.6 | 0.6 |
| Slump (in) | 7.50 | 7.25 | 6.50 | 6.75 | 6.00 | 7.50 |
| % Air (Volumetric) | 11.0 | 10.5 | 4.3 | 14.0 | 7.5 | 4.0 |

PC = polycarboxylate dispersant
ASA = amine solubilizing agent
Def = defoamer
AE-agent = air entraining agent

TABLE 6

| Sample | S96 | S97 | S98 |
|---|---|---|---|
| ASA | None | None | Dodecyl Dimethyl Amine |
| PC Dose | 0.08 | 0.08 | 0.08 |
| Def | none | TBP | TBP |
| AE-agent (fl.oz/cwt) | 0.3 | 0.3 | 0.3 |
| Slump (in) | 7.25 | 7.75 | 7.50 |
| % Air (Volumetric) | 8.5 | 7.0 | 5.0 |

PC = polycarboxylate dispersant
ASA = amine solubilizing agent
AE-agent = air entraining agent
Def = defoamer The results shown in Tables 4, 5, and 6 demonstrate that the combination of amine solubilizing agent and defoamer lowers concrete air contents at room temperature (70° F.) and at colder temperatures (50° F.). As shown in Table 4 the air content of non-air-entrained concrete is reduced to a desirable level of less than 2.5%. In addition, the combination of amine solubilizing agent and defoamer lowered concrete air contents in the presence of an air-entraining agent at multiple levels of polycarboxylate dispersant as shown in Tables 5 and 6.

In Table 4 all the samples containing amine solubilizing agents (Oleyl Amine 2EO, Decyl Amine 2EO, Tallow Amine 2EO) and insoluble defoamer had lower air contents than the samples with amine solubilizing agent alone. There was little or no difference between the air content of the control (no amine solubilizing agent or insoluble defoamer) and the samples without the insoluble defoamer. This demonstrates that the defoaming potential is governed primarily by the interaction of the insoluble defoamer and the amine solubilizing agent, rather than by the amine solubilizing agent alone.

Table 5 demonstrates that with constant levels of air entrainer and polycarboxylate dispersant the samples with the amine solubilizing agent and insoluble defoamer reduced the air content of the concrete mixture by about one-half as compared to the control (no amine solubilizing agent or insoluble defoamer) and the samples without insoluble defoamer.

Table 6 shows that the greater defoaming performance from the amine solubilizing agent and defoamer combination becomes even more advantageous at low dispersant dosages where air-entraining agent dosages can become so small that they are difficult to deliver reliably under field conditions.

Test solutions that were used to generate the data in Tables 7 and 8 comprised water, an insoluble defoamer, amine solubilizing agent, and acetic acid. The amounts of the material shown are based on percent by weight of cement. The solutions were prepared by combining water, acid, amine solubilizing agent, and insoluble defoamer, then stirring with a magnetic stir bar in a glass beaker. The polycarboxylate dispersant was added as a separate solution to the cementitious mixture.

Table 7 summarizes performance data for an amine solubilizing agent, insoluble defoamer, and polycarboxylate dispersant in non-air-entrained concrete. All but one sample delivered 0.0032% TBP (tributylphosphate) and 0.0048% amine solubilizing agent by weight of cement for an amine solubilizing agent to insoluble defoamer ratio of 1.5:1 unless otherwise stated. Slump and air content determinations were made after 5 minutes of mixing.

TABLE 7

| Sample | ASA | PC Dose | Slump (in.) | % Air (volumetric) | Aq. Def. Soln Appearance |
|---|---|---|---|---|---|
| S99 | Oleyl Amine 2EO | 0.08 | 8.00 | 2.5 | Clear |
| S100 | Stearyl Amine 2EO | 0.08 | 8.00 | 2.6 | Cloudy |
| S101 | Tallow Amine 2EO | 0.08 | 7.50 | 2.6 | Clear |
| S102 | Tallow Amine 2PO | 0.08 | 8.00 | 2.0 | Clear |
| S103 | Tallow Amine 5EO | 0.08 | 7.50 | 3.0 | Cloudy |
| S104 | Tallow Amine 15EO | 0.08 | 7.75 | 3.0 | Cloudy |
| S105 | Tallow Amine 15EO (2.5:1 ratio) | 0.08 | 7.75 | 5.7 | Clear |
| S106 | Oleamidopropyl dimethylamine | 0.08 | 8.00 | 2.1 | Clear |
| S107 | Stearamidopropyl dimethylamine | 0.08 | 8.00 | 1.7 | Clear |
| S108 | Lauramidopropyl dimethylamine | 0.08 | 8.25 | 3.3 | Clear |
| S109 | 1-hydroxyethyl-2-oleylimidazoline | 0.08 | 7.25 | 3.0 | Clear |
| S110 | 1-hydroxyethyl-2-cocoimidazoline | 0.08 | 7.25 | 3.5 | Clear |
| S111 | None | 0.08 | 8.25 | 2.0 | Cloudy |

PC = polycarboxylate dispersant
Def = defoamer
ASA = amine solubilizing agent

The results in Table 7 demonstrate that the combination of polycarboxylate dispersant, amine solubilizing agent and defoamer generally gave low air content in non-air-entrained concrete. The amine solubilizing agents that contained shorter alkyl groups and higher EO content (Lauramidopropyl dimethylamine, 1-hydroxyethyl-2-cocoimidazoline, Tallow Amine 5EO and Tallow Amine 15EO) had higher air contents than the corresponding lower EO or longer alkyl chain containing amine solubilizing agents.

Table 8 summarizes performance data for an amine solubilizing agent, insoluble defoamer, and acetic acid solutions, and a separately added polycarboxylate dispersant in air entrained concrete. One sample (as noted) was prepared as a clear solution of amine solubilizing agent, insoluble defoamer, acetic acid, and polycarboxylate dispersant. Two air entraining agents, both commercially available, proprietary products, AE®90 admixture, manufactured by Master Builders, Inc., Cleveland, Ohio, and Micro-Air admixture, were used at the dosages indicated in Table 8. All samples delivered 0.0032% TBP (Tributyl Phosphate) and 0.0048% amine solubilizing agent by weight of cement unless otherwise stated.

TABLE 8

| Sample | ASA | PC Dose | AEA | AEA Dose | Slump (in.) | % Air | Aq. Def. Soln Appearance |
|---|---|---|---|---|---|---|---|
| S112 | Oleyl Amine 2EO | 0.08 | Micro-Air | 0.25 | 8.00 | 6.1 | Clear |
| S113 | Oleyl Amine 2EO + PC | 0.08 | Micro-Air | 0.25 | 8.00 | 0.5 | Clear with PC |
| S114 | Tallow Amine 2EO | 0.08 | Micro-Air | 0.25 | 7.75 | 6.0 | Clear |
| S115 | Tallow Amine 2PO | 0.08 | Micro-Air | 0.25 | 8.00 | 6.5 | Clear |
| S116 | Tallow Amine 5EO (2.5:1 ratio) | 0.08 | Micro-Air | 0.25 | 8.00 | 11.0 | Clear |
| S117 | Oleamidopropyl dimethylamine | 0.08 | Micro-Air | 0.25 | 8.00 | 10.5 | Clear |
| S118 | 1-hydroxyethyl-2-Oleylimidazoline | 0.08 | Micro-Air | 0.25 | 8.50 | 12.0 | Clear |
| S119 | Oleyl Amine 2EO | 0.08 | AE90 | 1.2 | 8.00 | 5.5 | Clear |
| S120 | Tallow Amine 2EO | 0.08 | AE90 | 1.2 | 7.75 | 6.0 | Clear |
| S121 | Tallow Amine 5EO | 0.08 | AE90 | 1.2 | 7.75 | 5.8 | Clear |
| S122 | Tallow Amine 2PO | 0.08 | AE90 | 1.2 | 7.75 | 6.0 | Clear |
| S123 | Oleamidopropyl dimethylamine | 0.08 | AE90 | 1.2 | 7.75 | 11.0 | Clear |
| S124 | Oleamidopropyl dimethylamine | 0.08 | AE90 | 0.6 | 7.75 | 7.5 | Clear |

PC = polycarboxylate dispersant
Def = defoamer
ASA = amine solubilizing agent
AEA = Air-entraining agent These results demonstrate that the combination of amine solubilizing agent and defoamer can be used with different air-entraining agent chemistries to entrain desired and controlled air contents in concrete. Lower air contents were generally obtained with lower alkoxylate amine solubilizing agent's compared with other amine solubilizing agents. Additionally, the air content of the Oleamidopropyl dimethylamine sample was reduced to an acceptable level when the dosage of AE90 air entrainer was reduced.

Therefore, the present invention provides an admixture containing a water insoluble defoamer, an amine solubilizing agent capable of solubilizing the water insoluble defoamer in an acidic medium, and optionally a dispersant for cementitious compositions, for controlling the amount of air in a predictable manner in cementitious compositions.

The present invention also provides a cementitious composition comprising cementitious material, water, a water insoluble defoamer, an amine solubilizing agent capable of solubilizing the water insoluble defoamer, and optionally a dispersant for cementitious compositions, for controlling the amount of air in a predictable manner in the cementitious composition.

The present invention also provides a method of making a cementitious composition comprising mixing cementitious material, water, a water insoluble defoamer, an amine solubilizing agent capable of solubilizing the water insoluble defoamer, and optionally a dispersant for cementitious compositions, for controlling the amount of air in a predictable manner in the cementitious composition.

It should be appreciated that the present invention is not limited to the specific embodiments described above, but includes variations, modifications and equivalent embodiments defined by the following claims. The embodiments disclosed alone are not necessarily in the alternative, as various embodiments of the invention may be combined to provide desired characteristics or results.

What is claimed is:

1. An admixture composition for cementitious compositions comprising a water insoluble defoamer, an amine solubilizing agent capable of solubilizing the water insoluble defoamer in an acidic medium that is at least one of a (mono, di, tri or tetra)alkyl ether amine, alkoxylated amine, alkyl amide amine, alkyl imidazoline, alkyl (di, tri or tetra) ether amine, alkoxylated (di or tri)amine, ethoxylated alkyl ether amine, or mixtures thereof, and optionally a dispersant for cementitious compositions.

2. A cementitious composition comprising cementitious material, a water insoluble defoamer, an amine solubilizing agent capable of solubilizing the water insoluble defoamer that is at least one of a (mono, di, tri or tetra)alkyl ether amine, alkoxylated amine, alkyl amide amine, alkyl imidazoline, alkyl (di, tri or tetra) ether amine, alkoxylated (di or tri)amine, ethoxylated alkyl ether amine, or mixtures thereof, and optionally a dispersant for cementitious compositions.

3. The composition of claim 1 or 2 further characterized in that prior to addition to cementitious material the acidic medium is first combined with the amine solubilizing agent capable of solubilizing the water insoluble defoamer, followed by the water insoluble defoamer, then optionally the dispersant.

4. The composition of claim 1 or 2 further characterized, in that prior to addition to cementitious material the water insoluble defoamer, the amine solubilizing agent capable of solubilizing the water insoluble defoamer, and optionally the dispersant for cementitious compositions are combined with an acidic medium in combination.

5. The composition of claim 1 or 2 wherein the amine solubilizing agent comprises a total of about 8 carbons to abour 100 carbons.

6. The composition of claim 1 or 2 wherein the amine solubilizing agent comprises less than about 30 ethoxylate units.

7. The composition of claim 1 or 2 wherein the amine solubilizing agent comprises less than about 15 ethoxylate units.

8. The composition of claim 1 or 2, wherein the (mono, di, tri or tetra)alkyl ether amine is at least one of decyl ether amine or tetradecyl ether amine, or mixtures thereof.

9. The composition of claim 1 or 2, wherein the alkoxylated amine is at least one of an ethoxylated(2)cocoalkyl amine, propoxylated(2)tallowalkyl amine, bis (2-hydroxyethyl)oleyl amine, bis (2-hydroxyethyl)octadecyl amine, polyoxyethylene(3-15)tallowalkyl amine, bis (2-hydroxyethyl)cocoalkyl amine N-oleyl-1,1-iminobis-2-propanol, or mixtures thereof.

10. The composition of claim 1 or 2, wherein the alkyl amide amine is at least one of a lauramidopropyl dimethylamine, stearamidopropyl dimethylamine, oleamidopropyl dimethylamine, or mixtures thereof.

11. The composition of claim 1 or 2, wherein the alkyl imidazoline is at least one of 1-(2-hydroxyethyl)-2-(heptadecenyl)imidazoline, oleyl hydroxyethyl imidazoline, cocoalkyl hydroxyethyl imididazoline, or mixtures thereof.

12. The composition of claim 1 or 2, wherein the alkyl (di, tri or tetra) ether amine is at least one of iso tridecyloxypropyl-1,3-diaminopropane, tetra decyloxypropyl-1,3-diaminopropane or mixtures thereof.

13. The composition of claim 1 or 2, wherein the alkoxylated (di or tri) amine is ethoxylated (3)N-tallow-1,3-diaminopropane.

14. The composition of claim 1 or 2, wherein the amine solubilizing agent is activated with an acid.

15. The composition of claim 14, wherein the amine solubilizing agent is deactivated at an alkaline pH.

16. The composition of claim 1 or 2 further comprising an air entraining agent.

17. The composition of claim 1 or 2 further comprising at least one of set accelerators, set retarders, air detraining agents, foaming agents, dampproofing admixtures, pumping aids, fungicidal admixtures, insecticidal admixtures, germicidal admixtures, alkali activity reducers, bonding admixtures, corrosion inhibitors, or pigments.

18. The composition of claim 1 or 2, wherein prior to addition to cementitious material the amine solubilizing agent is present in an amount sufficient to form a stable micellar solution.

19. The composition of claim 1, wherein the composition comprises about 0.02% to about 60% amine solubilizing agent, about 0.02% to about 30% insoluble defoamer, about 0 to about 60% dispersant for cementitious compositions, and 0 to about 25% of an acid based on weight of dry solids.

20. The composition of claim 19, wherein the composition comprises about 0.25% to about 10% insoluble defoamer based on weight of dry solids.

21. The composition of claim 2 wherein the amine solubilizing agent is present in an amount from about 0.0001% to about 0.2% primary active ingredient; the insoluble defoamer is present in an amount from about 0.0001% to about 0.1% primary active ingredient; the dispersant for cementitious compositions is present in an amount from 0 to about 2% primary active ingredient; and an acid is present in an amount from 0 to about 2% primary active ingredient based on the dry weight of the cementitious material.

22. The composition of claim 21 wherein the dispersant for cementitious compositions is present in an amount from about 0.05% to about 0.5% primary active ingredient based on the dry weight of the cementitious material.

23. The composition of claim 1 or 2, wherein the water insoluble defoamer is at least one of a mineral oil, a vegetable oil, a fatty acid ester, an ether compound, a hydroxyl functional compound, an alcohol, a phosphoric ester, a silicone, polyoxyalkylene, a polymer comprising at least one of propylene oxide or ethylene oxide moieties, a hydrocarbon, or an acetylenic compound.

24. The composition of claim 1 or 2, wherein the water insoluble defoamer is at least one of nonyl phenol, polypropylene oxide, triisobutyl phosphate, kerosene, liquid paraffin, animal oil, vegetable oil, sesame oil, castor oil, alkylene oxide, natural wax, linear or branched fatty alcohols and their alkoxylated derivatives, octyl alcohol, hexadecyl alcohol, acetylenic alcohol, acetylinic alcohol alkoxylates, glycols, polyoxyalkylene glycol, polyoxyalkylene amide, acrylate polyamine, tributyl phosphate, silicone oil, silicone paste, silicone emulsion, organic modified polysiloxane, fluorosilicone oil; or polyoxyethylene polyoxypropylene adducts.

25. The composition of claim 2, wherein the cement is selected from the group consisting of portland cement, masonry cement, alumina cement, refractory cement, magnesia cement, calcium sulfoaluminate cement, oil well cement, and mixtures thereof.

26. The composition of claim 2 further comprising a cement admixture or additive that is at least one of pozzolan, calcine clay, or aggregate.

27. The cementitious composition of claim 26, wherein the aggregate is at least one of silica, quartz, crushed round marble, glass spheres, granite, limestone, calcite, feldspar, alluvial sands, or sand.

28. The cementitious composition of claim 26, wherein the pozzolan is at least one of natural pozzolan, fly ash, silica fume, calcined clay, or blast furnace slag.

29. The composition of claim 1 or 2 wherein the dispersant for cementitious compositions is at least one polycarboxylate high range water reducing dispersant selected from the group consisting of:

a) a dispersant of Formula (I):

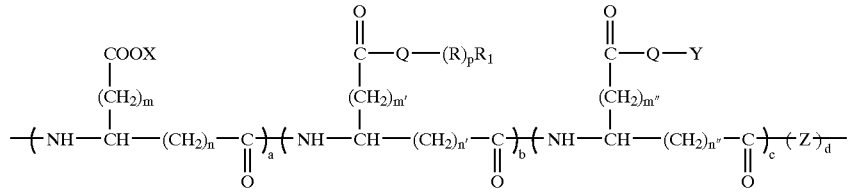

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;

Y is at least one of hydrogen, an alkali earth metal ion, an alkaline earth metal ion, ammonium ion, amine, a hydrophobic hydrocarbon or polyalkylene oxide moiety that functions as a defoamer;

m, m', m", n, n', and n" are each independently 0 or an integer between 1 and about 20;

Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and wherein a, b, c, and d reflect the mole fraction of each unit wherein the sum of a, b, c, and d equal one, wherein a, b, c, and d are each a value greater than or equal to zero and less than one, and at least two of a, b, c and d are greater than zero;

b) a dispersant of Formula (II):

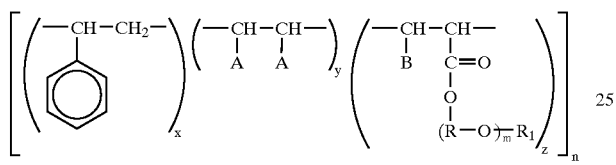

wherein in Formula (II):

A is COOM or optionally in the "y" structure an acid anhydride group (—CO—O—CO—) is formed in place of the A groups between the carbon atoms to which the A groups are bonded to form an anhydride;

B is COOM

M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;

R is a $C_{2-6}$ alkylene radical;

R1 is a $C_{1-20}$ alkyl, $C_{6-9}$ cycloalkyl, or phenyl group;

x, y, and z are a number from 0.01 to 100;

m is a number from 1 to 100; and n is a number from 10 to 100;

c) a dispersant comprising at least one polymer or a salt thereof having the form of a copolymer of
   i) a maleic anhydride half-ester with a compound of the formula $RO(AO)_mH$, wherein R is a $C_1$–$C_{20}$ alkyl group, A is a $C_{2-4}$ alkylene group, and m is an integer from 2–16; and
   ii) a monomer having the formula $CH_2=CHCH_2—(OA)_nOR$, wherein n is an integer from 1–90 and R is a $C_{1-20}$ alkyl group;

d) a dispersant obtained by copolymerizing 5 to 98% by weight of an (alkoxy)polyalkylene glycol mono(meth)acrylic ester monomer (a) represented by the following general formula (1):

$$\begin{array}{c} R_5 \\ | \\ CH=C-R_1 \\ | \\ COO(R_2O)_mR_3 \end{array} \quad (1)$$

-continued

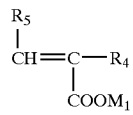

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a reaction product of component A, optionally component B, and component C;

wherein each component A is independently a nonpolymeric, multi-functional moiety or combination of mono or multifunctional moieties that adsorbs onto a cementitious particle, and contains at least one residue derived from a first component select from the group consisting of phosphates, phosphonates, phosphinates, hypophosphites, sulfates, sulfonates, sulfinates, alkyl trialkoxy silanes, alkyl triacyloxy silanes, alkyl triaryloxy silane, borates, boronates, boroxines, phosphoraniides, amines, amides, quaternary ammonium groups, carboxylic acids, carboxylic acid ester, alcohols, carbohydrates, phosphate esters of sugars, borate esters of sugars, sulfate esters of sugars, salts of any of the preceding moieties, and mixtures thereof;

wherein component B is an optional moiety, where if present, each component B is independently a nonpolymeric moiety that is disposed between the component A moiety and the component C moiety, and is derived from a second component select from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is linear or branched water soluble, nonionic polymer substantially non-adsorbing to cement particles, and is selected from the group consisting of poly(oxyallcylene glycol), poly(oxyalkylene amine), poly(oxyalkylene diamine), monoalkoxy poly(oxyalkylene amine), monoaryloxy poly

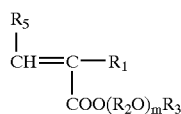

(oxyalkylene amine), monoalkoxy poly(oxyalkylen glycol), monoaryloxy poly(oxyalkylene glycol), poly(vinyl pyrrolidones), poly(methyl vinyl ethers), poly(ethylene imines), poly(acrylamides), polyoxazoles, and mixtures thereof; and g) a dispersant of Formula (III):

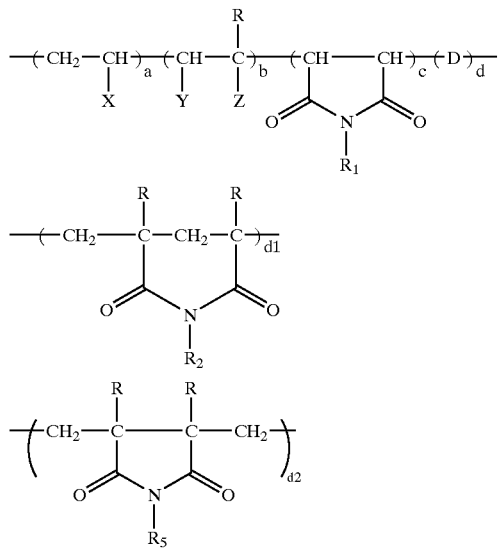

wherein in Formula (III):

D=a component selected from the group consisting of the structure d1, the structure d2, and mixtures thereof;

X=H, $CH_3$, $C_2$ to $C_6$ Alkyl, Phenyl, p-Methyl Phenyl, or Sulfonated Phenyl;

Y=H or —COOM;

R=H or $CH_3$;

Z=H, —$SO_3$M, —$PO_3$M, —COOM, —$O(CH_2)_n OR_3$ where n=2 to 6, —$COOR_3$, or —$(CH_2)_n OR_3$ where n=0 to 6, —$CONHR_3$, —$CONHC(CH_3)_2 CH_2 SO_3 M$, —$COO(CHR_4)_n OH$ where n=2 to 6, or —$O(CH_2)_n OR_4$ wherein n=2 to 6;

$R_1$, $R_2$, $R_3$, $R_5$ are each independently —$(CHRCH_2O)_m R_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$=H, Methyl, $C_2$ to about $C_6$ Alkyl, or about $C_6$ to about $C_{10}$ aryl;

M=H, Alkali Metal, Alkaline Earth Metal, Ammonium, Amine, triethanol amine, Methyl, or $C_2$ to about $C_6$ Alkyl;

a=0 to about 0.8;
b=about 0.2 to about 1.0;
c=0 to about 0.5;
d=0 to about 0.5; and wherein a, b, c, and d represent the mole fraction of each unit and the sum of a, b, c, and d is 1.0;

h) a dispersant of Formula (IV):

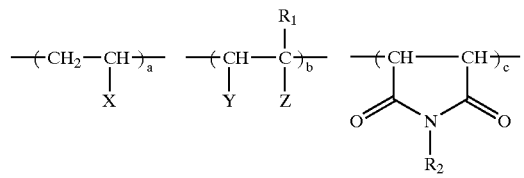

wherein in Formula (IV):

the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, p-Methyl Phenyl, p-Ethyl Phenyl, Carboxylated Phenyl, or Sulfonated Phenyl;

Y=H, —COOM, —COOH, or W;

W=a hydrophobic defoamer represented by the formula $R_5 O—(CH_2 CH_2 O)_s—(CH_2 C(CH_3)HO)_t—(CH_2 CH_2 O)_u$ where s, t, and u are integers from 0 to 200 with the proviso that t>(s+u) and wherein the total amount of hydrophobic defoamer is present in an amount less than 10% by weight of the polycarboxylate dispersant;

Z=H, —COOM, —$O(CH_2)_n OR_3$ where n=2 to 6, —$COOR_3$, —$(CH_2)_n OR_3$ where n=0 to 6, or —$CONHR_3$;

$R_1$=H, or $CH_3$;

$R_2$, $R_3$, are each independently a random copolymer of oxyethylene units and oxypropylene units of the general formula —$(CH(R_1)CH_2 O)_m R_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_5$=$C_1$ to $C_{18}$ alkyl or $C_6$ to $C_{18}$ alkyl aryl;

M=Alkali Metal, Alkaline Earth Metal, Ammonia, Amine, monoethanol amine, diethanol amine, triethanol amine, morpholine, imidazole;

a=0.01–0.8;
b=0.2–0.99;
c=0–0.5; and wherein a, b, c represent the mole fraction of each unit and the sum of a, b, and c, is 1;

i) a random copolymer corresponding to the following Formula (V) in free acid or salt form having the following monomer units and numbers of monomer units:

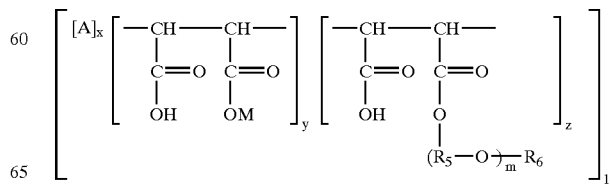

wherein A is selected from the moieties (i) or (ii)

—CR₁R₂—CR₃R₄— (i)

(ii)

wherein $R_1$ and $R_3$ are selected from the group consisting of substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;

$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_mR_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

j) a copolymer of oxyalkyleneglycol-alkenyl ethers and unsaturated dicarboxylic acids, comprising:

i) 0 to 90 mol % of at least one component of the formula 3a or 3b:

(3a)

(3b)

wherein M is a hydrogen atom, a mono- or divalent metal cation, an ammonium ion or an organic amine residue, a is 1, or when M is a divalent metal cation a is ½;

wherein X is —$OM_a$,

—O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms m is 2 to 4, and n is 0 to 100, —$NHR_2$, —$N(R^2)_2$ or mixtures thereof in which $R^2=R^1$ or —CO—$NH_2$; and wherein Y is an oxygen atom or —$NR^2$;

ii) 1 to 89 mol % of components of the general formula 4:

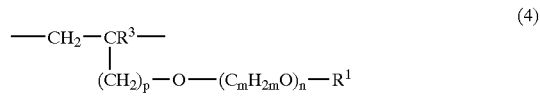
(4)

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, is 2 to 4, and n is 0 to 100, and iii) 0.1 to 10 mol % of at least one component of the formula 5a or 5b:

(5a)

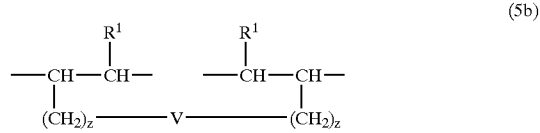
(5b)

wherein S is a hydrogen atom or —$COOM_a$ or —$COOR_5$, T is —$COOR_5$, —W—$R_7$, —CO—[—NH—(CH2)3)-]$_s$—W—$R_7$, —CO—O—$(CH_2)_z$—W—$R_7$, a radical of the general formula:

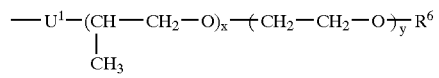

or —$(CH_2)_z$—V—$(CH_2)_z$—CH=CH—$R_1$, or when S is —$COOR_5$ or —$COOM_a$, $U_1$ is —CO—NHM—, —O— or —$CH_2O$, $U_2$ is —NH—CO—, —O— or —$OCH_2$, V is —O—CO—$C_6H_4$—CO—O— or —W—, and W is

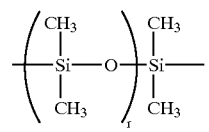

R4 is a hydrogen atom or a methyl radical, R5 is aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6=R_1$ or

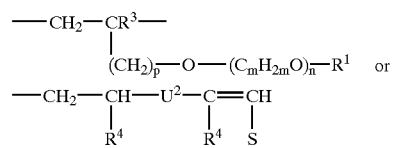

$R_7 = R_1$ or

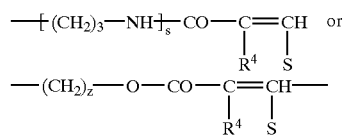

r is 2 to 100, s is 1 or 2, x is 1 to 150, y is 0 to 15 and z is 0 to 4;

iv) 0 to 90 mol % of at least one component of the formula 6a, 6b, or 6c:

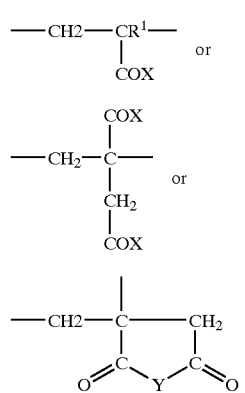

wherein M is a hydrogen atom, a mono- or divalent metal cation, an ammonium ion or an organic amine residue, a is 1, or when M is a divalent metal cation a is ½;

wherein X is —OM$_a$,
—O—(C$_m$H$_{2m}$O)$_n$—R$^1$ in which R$^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulphonic substituted aryl radical containing 6 to 14 carbon atoms m is 2 to 4, and n is 0 to 100, —NH—(C$_m$H$_{2m}$O)$_n$—R$^1$, —NH$_2$, —N(R$^2$)$_2$ or mixtures thereof in which R$^2$=R$^1$ or
—CO—NH$_2$; and
wherein Y is an oxygen atom or —NR$^2$;

k) a copolymer of dicarboxylic acid derivatives and oxyalkylene glycol-alkenyl ethers, comprising:
i) 1 to 90 mol. % of at least one member selected from the group consisting of structural units of Formula 7a and Formula 7b:

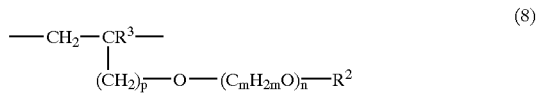

(7b)

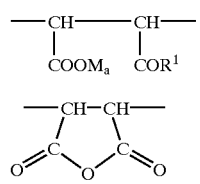

wherein M is H, a monovalent metal cation, a divalent metal cation, an ammonium ion or an organic amine;
a is ½ when M is a divalent metal cation or 1 when M is a monovalent metal cation;
wherein R$^1$ is —OM$_a$, or
—O—(C$_m$H$_{2m}$O)$_n$—R$^2$ wherein R$^2$ is H, a C$_{1-20}$ aliphatic hydrocarbon, a C$_{5-8}$ cycloaliphatic hydrocarbon, or a C$_{6-14}$ aryl that is optionally substituted with least one member selected from the group consisting of [—COOM$_a$, —(SO$_3$)M$_a$, and —(PO$_3$)M$_{a2}$];
m is 2 to 4;
n is 1 to 200;
ii) 0.5 to 80 mol. % of the structural units of Formula 8:

$$—CH_2—CR^3— \atop | \atop (CH_2)_p—O—(C_mH_{2m}O)_{\overline{n}}—R^2 \qquad (8)$$

wherein R$^3$ is H or a C$_{1-5}$ aliphatic hydrocarbon;
p is 0 to 3;
R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of [—COOM$_a$, —(SO$_3$)M$_a$, and —(PO$_3$)M$_{a2}$];
m is 2 to 4;
n is 1 to 200;
iii) 0.5 to 80 mol. % structural units selected from the group consisting of Formula 9a and Formula 9b:

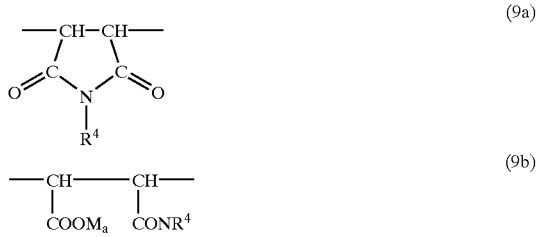

wherein R$^4$ is H, C$_{1-20}$ aliphatic hydrocarbon that is optionally substituted with at least one hydroxyl group, —(C$_m$H$_{2m}$O)$_n$—R$^2$, —CO—NH—R$^2$, C$_{5-8}$ cycloaliphatic hydrocarbon, or a C$_{6-14}$ aryl that is optionally substituted with at least one member selected from the group consisting of [—COOM$_a$, —(SO$_3$)M$_a$, and —(PO$_3$)M$_{a2}$];
M is H, a monovalent metal cation, a divalent metal cation, an ammonium ion or an organic amine;
a is ½ when M is a divalent metal cation or 1 when M is a monovalent metal cation;
R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of [—COOM$_a$, —(SO$_3$)M$_a$, and —(PO$_3$)M$_{a2}$];
m is 2 to 4;
n is 1 to 200;
iv) 1 to 90 mol. % of structural units of Formula 10

wherein R$^5$ is methyl, or methylene group, wherein R$^5$ forms one or more 5 to 8 membered rings with R$^7$;
R$^6$ is H, methyl, or ethyl;
R$^7$ is H, a C$_{1-20}$ aliphatic hydrocarbon, a C$_{6-14}$ aryl that is optionally substituted with at least one member selected from the group consisting of [—COOM$_a$, —(SO$_3$)M$_a$, and —(PO$_3$)M$_{a2}$], a C$_{5-8}$ cycloaliphatic hydrocarbon, —OCOR$^4$, —OR$^4$, or —COOR$^4$, wherein R$^4$ is H, a C$_{1-20}$ aliphatic hydrocarbon that is optionally substituted with at least one —OH, —(C$_m$H$_{2m}$O)$_n$—R$^2$, —CO—NH—R$^2$, C$_{5-8}$ cycloaliphatic hydrocarbon, or a C$_{6-14}$ aryl residue that is optionally substituted with a member selected from the group consisting of [—COOM$_a$, —(SO$_3$)M$_a$, —(PO$_3$)M$_{a2}$].

30. A method of making a cementitious composition comprising mixing the composition of claim 29 containing cementitious material with water.

31. The method of claim 30, wherein the amine solubilizing agent is activated with an acid.

32. The method of claim 31, including deactivating the amine solubilizing agent at an alkaline pH.

33. The method of claim 30 wherein the amine solubilizing agent comprises a total of about 8 carbons to about 100 carbons.

34. The method of claim 30 wherein the amine solubilizing agent comprises less than about 30 ethoxylate units.

35. The method of claim 30 wherein the amine solubilizing agent comprises less than about 15 ethoxylate units.

36. The method of claim 30 wherein the amine solubilizing agent is present in an amount from about 0.0001% to about 0.2% primary active ingredient; the insoluble defoamer is present in an amount from about 0.0001% to about 0.1% primary active ingredient; the dispersant for cementitious compositions is present in an amount from 0 to about 2% primary active ingredient; and an acid is present in an amount from 0 to about 2% primary active ingredient based on the dry weight of the cementitious material.

37. The method of claim 36 wherein the dispersant for cementitious compositions is present in an amount from about 0.05% to about 0.5% primary active ingredient based on the dry weight of the cementitious material.

38. The method of claim 30 further characterized in that prior to addition to cementitious material the acidic medium is first combined with the amine solubilizing agent capable of solubilizing the water insoluble defoamer, followed by the water insoluble defoamer, then optionally the dispersant.

39. The method of claim 30 further characterized, in that prior to addition to cementitious material the water insoluble defoamer, the amine solubilizing agent capable of solubilizing the water insoluble defoamer, and optionally the dispersant for cementitious compositions are combined with an acidic medium in combination.

40. The method of claim 30, wherein the (mono, di, tri or tetra)alkyl ether amine is at least one of decyl ether amine, tetradecyl ether amine, or mixtures thereof.

41. The method of claim 30, wherein the alkoxylated amine is at least one of an ethoxylated(2)cocoalkyl amine, propoxylated(2)tallowalkyl amine, bis (2-hydroxyethyl) oleyl amine, bis (2-hydroxyethyl)octadecyl amine, polyoxyethylene(3-15)tallowalkyl amine, bis (2-hydroxyethyl)cocoalkyl amine or N-oleyl-1,1-iminobis-2-propanol, or mixtures thereof.

42. The method of claim 30, wherein the alkyl amide amine is at least one of a lauramidopropyl dimethylamine, stearamidopropyl dimethylamine, oleamidopropyl dimethylamine, or mixtures thereof.

43. The method of claim 30, wherein the alkyl imidazoline is at least one of 1-(2-hydroxyethyl)-2-(heptadecenyl) imidazoline, oleyl hydroxyethyl imidazoline, cocoalkyl hydroxyethyl imididazoline, mixtures thereof.

44. The method of claim 30, wherein the alkyl (di, tri or tetra) ether amine is at least one of iso tridecyloxypropyl-1,3-diaminopropane, tetra decyloxypropyl-1,3-diaminopropane or mixtures thereof.

45. The method of claim 30, wherein the alkoxylated (di or tri) amine is ethoxylated (3)N-tallow-1,3-diaminopropane.

46. The method of claim 30, wherein the water insoluble defoamer is at least one of a mineral oil, a vegetable oil, a fatty acid ester, an ether compound, a hydroxyl functional compound, an alcohol, a phosphoric ester, a silicone, polyoxyalkylene, a polymer comprising at least one of propylene oxide or ethylene oxide moieties, a hydrocarbon, or an acetylenic compound.

47. The method of claim 30, wherein the water insoluble defoamer is at least one of nonyl phenol, polypropylene oxide, triisobutyl phosphate, kerosene, liquid paraffin, animal oil, vegetable oil, sesame oil, castor oil, alkylene oxide , natural wax, linear or branched fatty alcohols and their alkoxylated derivatives, octyl alcohol, hexadecyl alcohol, acetylene alcohol, acetylinic alcohol alkoxylates, glycols, polyoxyalkylene glycol, polyoxyalkylene amide, acrylate polyamine, tributyl phosphate, silicone oil, silicone paste, silicone emulsion, organic modified polysiloxane, fluorosilicone oil; or polyoxyethylene polyoxypropylene adducts.

48. The method of claim 30, wherein the cement is selected from the group consisting of portland cement, masonry cement, alumina cement, refractory cement, magnesia cement, calcium sulfoaluminate cement, oil well cement, and mixtures thereof.

49. The method of claim 30 further comprising mixing a cement admixture or additive into the cementitious composition, wherein the cement admixture or additive is at least one of set accelerators, set retarders, air detraining agents, foaming agents, dampproofing admixture, pumping aids, fungicidal admixtures, insecticidal admixtures, germicidal admixtures, alkali activity reducers, bonding admixtures, corrosion inhibitors, pozzolans, clay, pigments, or aggregates.

50. The method of claim 49 wherein the aggregate is at least one of silica, quartz, crushed round marble, glass spheres, granite, limestone, calcite, feldspar, alluvial sands, or sand.

51. The method of claim 49, wherein the pozzolan is at least one of natural pozzolan, fly ash, silica fume, calcined clay, or blast furnace slag.

52. The method of claim 30, wherein prior to addition to cementitious material the amine solubilizing agent is present in an amount sufficient to form a stable micellar solution.

53. The method of claim 30, wherein the water insoluble defoamer, the amine solubilizing agent capable of solubilizing the water insoluble defoamer, and optionally the dispersant for cementitious compositions are added as one solution to cementitious material.

54. A method of making a cementitious composition comprising mixing cementitious material, water, a water insoluble defoamer, an amine solubilizing agent capable of solubilizing the water insoluble defoamer that is at least one of a (mono, di, tri or tetra)alkyl ether amine, alkoxylated amine, alkyl amide amine, alkyl imidazoline, alkyl (di, tri or tetra) ether amine, alkoxylated (di or tri)amine, ethoxylated alkyl ether amine, or mixtures thereof, and optionally a dispersant for cementitious compositions.

55. The method of claim 54, wherein the amine solubilizing agent is activated with an acid.

56. The method of claim 55, wherein the amine solubilizing agent is deactivated at an alkaline pH.

57. The method of claim 54 wherein the amine solubilizing agent comprises a total of about 8 carbons to about 100 carbons.

58. The method of claim 54 wherein the amine solubilizing agent comprises less than about 30 ethoxylate units.

59. The method of claim 54 wherein the amine solubilizing agent comprises less than about 15 ethoxylate units.

60. The method of claim 54 wherein the amine solubilizing agent is present in an amount from about 0.001% to about 0.2% primary active ingredient; the insoluble defoamer is present in an amount from about 0.0001% to about 0.1% primary active ingredient; the dispersant for cementitious compositions is present in an amount from 0 to about 2% primary active ingredient; and an acid is present in an amount from 0 to about 2% primary active ingredient based on the dry weight of the cementitious material.

61. The method of claim 60 wherein the dispersant for cementitious compositions is present in an amount from about 0.05% to about 0.5% primary active ingredient based on the dry weight of the cementitious material.

62. The method of claim 54 further characterized in that prior to addition to cementitious material an acidic medium is first combined with the amine solubilizing agent capable of solubilizing the water insoluble defoamer, followed by the water insoluble defoamer, then optionally the dispersant.

63. The method of claim 54 further characterized, in that prior to addition to cementitious material the water insoluble defoamer, the amine solubilizing agent capable of solubilizing the water insoluble defoamer, and optionally the dispersant for cementitious compositions are combined with an acidic medium in combination.

64. The method of claim 54, wherein the (mono, di, tri or tetra)alkyl ether amine is at least one of decyl ether amine, tetradecyl ether amine, or mixtures thereof.

65. The method of claim 54, wherein the alkoxylated amine is at least one of an ethoxylated(2)cocoalkyl amine, propoxylated(2)tallowalkyl amine, bis (2-hydroxyethyl) oleyl amine, bis (2-hydroxyethyl)octadecyl amine, polyoxyethylene(3-15)tallowalkyl amine, bis (2-hydroxyethyl)cocoalkyl amine or N-oleyl-1,1-iminobis-2-propanol, or mixtures thereof.

66. The method of claim 54, wherein the alkyl amide amine is at least one of a lauramidopropyl dimethylamine, stearamidopropyl dimethylamine, oleamidopropyl dimethylamine, or mixtures thereof.

67. The method of claim 54, wherein the alkyl imidazoline is at least one of 1-(2-hydroxyethyl)-2-(heptadecenyl) imidazoline, oleyl hydroxyethyl imidazoline, cocoalkyl hydroxyethyl imididazoline, or mixtures thereof.

68. The method of claim 54, wherein the alkyl (di, tri or tetra) ether amine is at least one of iso tridecyloxypropyl-1,3-diaminopropane, tetra decyloxypropyl-1,3-diaminopropane or mixtures thereof.

69. The method of claim 54, wherein the alkoxylated (di or tri) amine is ethoxylated (3)N-tallow-1,3-diaminopropane.

70. The method of claim 54, wherein the water insoluble defoamer is at least one of a mineral oil, a vegetable oil, a fatty acid ester, an ether compound, a hydroxyl functional compound, an alcohol, a phosphoric ester, a silicone, polyoxyalkylene, a polymer comprising at least one of propylene oxide or ethylene oxide moieties, a hydrocarbon, or an acetylenic compound.

71. The method of claim 54, wherein the water insoluble defoamer is at least one of nonyl phenol, polypropylene oxide, triisobutyl phosphate, kerosene, liquid paraffin, animal oil, vegetable oil, sesame oil, castor oil, alkylene oxide, natural wax, linear or branched fatty alcohols and their alkoxylated derivatives, octyl alcohol, hexadecyl alcohol, acetylenic alcohol, acetylinic alcohol alkoxylates, glycols, polyoxyalkylene glycol, polyoxyalkylene amide, acrylate polyamine, tributyl phosphate, silicone oil, silicone paste, silicone emulsion, organic modified polysiloxane, fluorosilicone oil; and or polyoxyethylene polyoxypropylene adducts.

72. The method of claim 54, wherein the cement is selected from the group consisting of portland cement, masonry cement, alumina cement, refractory cement, magnesia cement, calcium sulfoaluminate cement, oil well cement, and mixtures thereof.

73. The method of claim 54 further comprising mixing a cement admixture or additive into the cementitious composition, wherein the cement admixture or additive is at least one of set accelerators, set retarders, air detraining agents, foaming agents, dampproofing admixtures pumping aids, fungicidal admixtures, insecticidal admixtures, germicidal admixtures, alkali activity reducers, bonding admixtures, corrosion inhibitors, pozzolans, clay, pigments, or aggregates.

74. The method of claim 73 wherein the aggregate is at least one of silica, quartz, crushed round marble, glass sphere, granite, limestone, calcite, feldspar, alluvial sands, or sand.

75. The method of claim 73, wherein the pozzolan is at least one of natural pozzolan, fly ash, silica fume, calcined clay, or blast furnace slag.

76. The method of claim 54, wherein prior to addition to cementitious material the amine solubilizing agent is present in an amount sufficient to form a stable micellar solution.

77. The method of claim 54, wherein the water insoluble defoamer, the amine solubilizing agent capable of solubilizing the water insoluble defoamer, and optionally the dispersant for cementitious compositions are added as one solution to cementitious material.

* * * * *